United States Patent [19]

Nagaoka

[11] Patent Number: 5,995,295
[45] Date of Patent: Nov. 30, 1999

[54] LENS SYSTEM

[75] Inventor: Toshiyuki Nagaoka, Akishima, Japan

[73] Assignee: Olympus Optical Co., Ltd., Tokyo, Japan

[21] Appl. No.: 08/764,521

[22] Filed: Dec. 12, 1996

[30] Foreign Application Priority Data

Dec. 13, 1995 [JP] Japan ................................ 7-346242
Dec. 13, 1995 [JP] Japan ................................ 7-346246

[51] Int. Cl.$^6$ ........................... G02B 3/00; G02B 15/14
[52] U.S. Cl. ........................................ 359/654; 359/676
[58] Field of Search ................................ 359/652, 654, 359/653, 717, 676, 683

[56] References Cited

U.S. PATENT DOCUMENTS

| 4,755,039 | 7/1988 | Hattori | 359/654 |
| 4,830,476 | 5/1989 | Aoki | 359/654 |
| 4,852,981 | 8/1989 | Suda | 359/654 |
| 5,148,205 | 9/1992 | Guilino et al. | 359/652 |
| 5,541,775 | 7/1996 | Kiriki | 359/654 |

FOREIGN PATENT DOCUMENTS

| 609093 | 8/1994 | European Pat. Off. . |
| 58-59420 | 4/1983 | Japan . |
| 60-218614 | 11/1985 | Japan . |
| 2-284107 | 11/1990 | Japan . |
| 4-114112 | 4/1992 | Japan . |
| 5-107471 | 4/1993 | Japan . |
| 58-184113 | 10/1993 | Japan . |
| 6-175016 | 6/1994 | Japan . |

*Primary Examiner*—Scott J. Sugarman
*Attorney, Agent, or Firm*—Pillsbury Madison & Sutro LLP

[57] ABSTRACT

A lens system which is composed of at least one homogeneous lens element and at least one radial type gradient index lens element, to be used as a combination lens system or an image pickup lens system, and configured to favorably correct chromatic aberration, etc. by selecting an adequate value for a coefficient representing an Abbe's number.

29 Claims, 15 Drawing Sheets

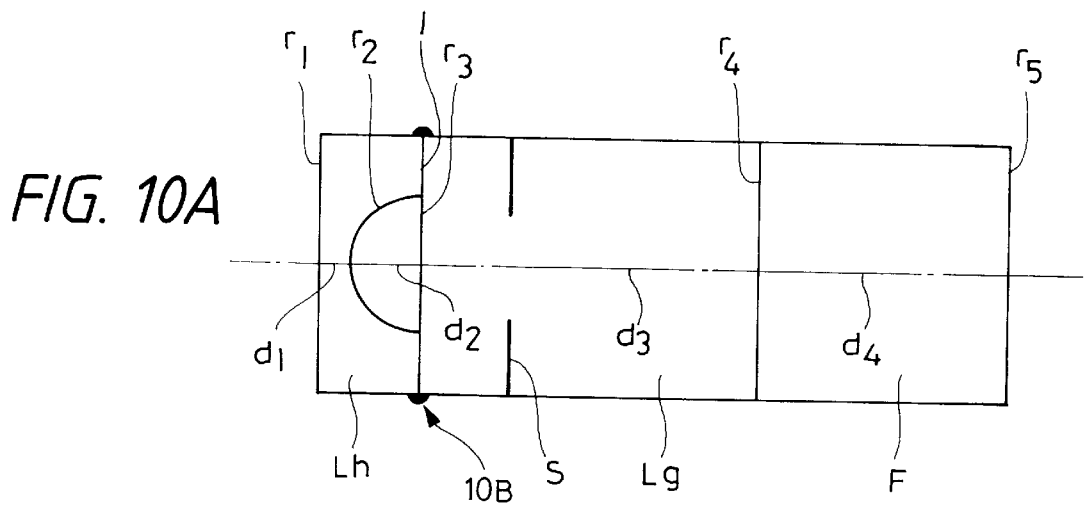
FIG. 10A
FIG. 10B
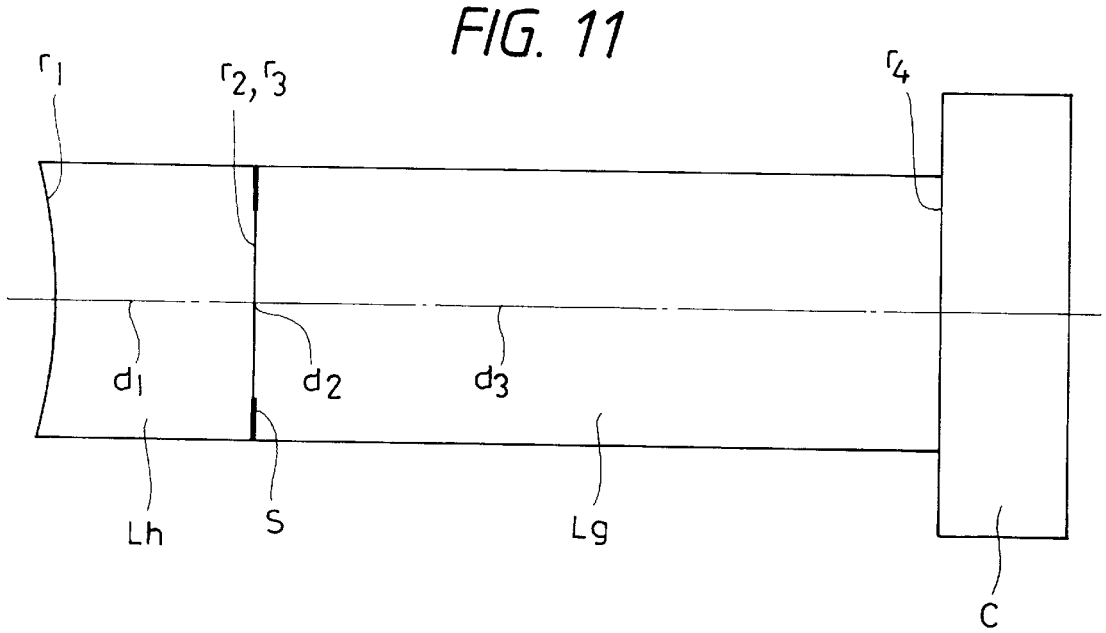
FIG. 11

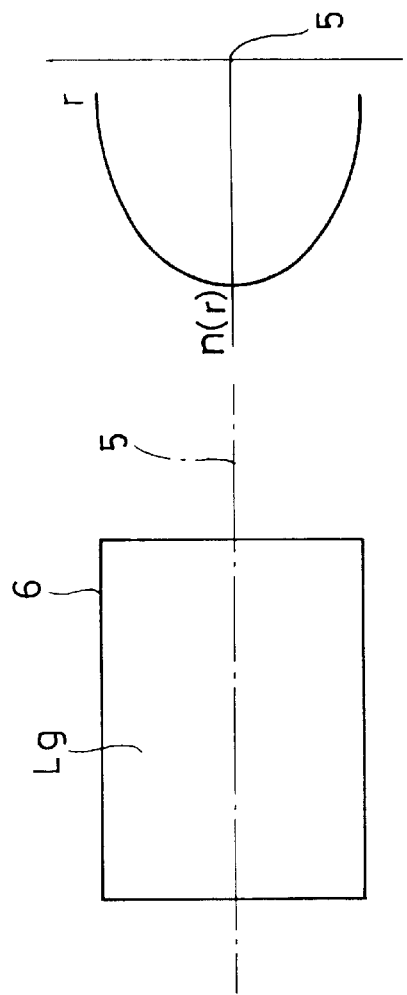
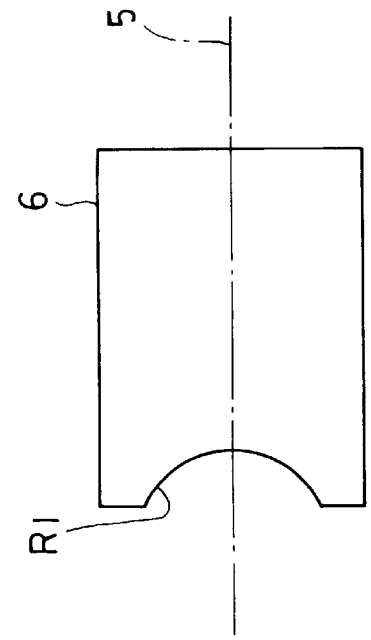
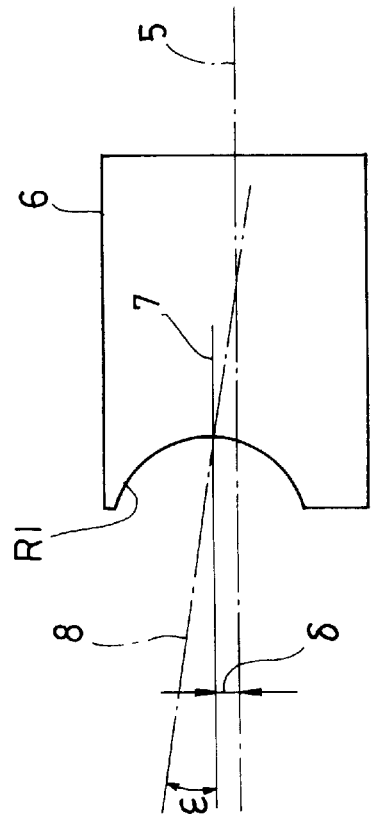
FIG. 19A PRIOR ART
FIG. 19B PRIOR ART
FIG. 19C PRIOR ART

LENS SYSTEM

BACKGROUND OF THE INVENTION a) Field of the Invention

The present invention relates to a combination lens system (a lens system which is composed of a plurality of lens elements and used as a lens), and also an image pickup lens system which is composed of a small number of lens elements and to be used with electronic image pickup apparatus such as TV cameras.

b) Description of the Prior Art

An optical system which is to be used under a white light source, for example an optical system for silver salt photographic cameras, microscopes, video cameras or endoscopes, must ordinarily be composed of a plurality of lens elements for favorably correcting aberrations such as chromatic aberration and a Petzval's sum. In addition to the requisite for correction of aberrations, it is generally demanded for reduction of a manufacturing cost, for example, to reduce a number of lens elements or simplify a structure of a lens barrel. As means for solving such a problem, it is conventionally known to use radial type gradient index lens elements. Since a radial type gradient.index lens element has a characteristic in that it is excellent for correcting chromatic aberration and a Petzval's sum in particular out of aberrations, it is effective to ruduce a number of lens elements which are used for composing a lens system to be used under a white light source. An optical system disclosed by Japanese Patent Kokai Publication No. Sho 60-218614, for example, is known as a conventional example of photographic lens system for silver salt photographic cameras which uses a radial type gradient index lens element. This conventional example is composed of two lens elements including a radial type gradient index lens element and equivalent to a Gaussian type optical system which conventionally reuqired six or seven lens elements. Further, a lens system disclosed by Japanese Patent Kokai Publication No. Hei 5-107471 is known as a conventional example of objective lens system for endoscopes which uses radial type gradient index lens elements. This conventional example is composed of two to six lens elements and equivalent to a retrofocus type lens system which conventionally required lens elements in a number of six or so. However, each of these conventional examples adopts spherical surfaces for the radial type gradient index lens element and can hardly allow optical axes of surfaces with that of medium in practical working stages with high precision, thereby being not preferable from a viewpoint of obtaining a lens system which has high optical performance or can be manufactured at low costs.

In the recent years where video cameras using solid-state image pickup devices such as CCD's, TV telephones and door phones with cameras are prevailing, it is demanded that lens systems to be used in these instruments are configured compacter and manufactured at lower costs. Though three to six lens elements are generally required to obtain favorable optical performance of such a lens system which has a fixed focal point and is to be used in these instruments, it is desired to further reduce the number of lens elements.

As means for reducing a number of lens elements to be used for composing an optical system while maintaining optical performance desired for the optical system, it is conventionally known to use radial type gradient index lens elements in the optical system. For example, a lens system disclosed by Japanese Patent Kokai Publication No. Hei 6-175016 is known as a conventional example of lens system which is composed of a single radial type gradient index lens element. However, this conventional example has an extremely large F number of 9.8 to 13.5 or small aperture for balancing aberrations or enhancing imaging performance. Further, a lens system disclosed by Japanese Patent Kokai Publication No. Sho 60-218614 is known as a conventional lens system which is composed of two lens elements. This conventional example has favorably corrected aberrations, but requires a high manufacturing cost due to a fact that it uses two radial type gradient index lens elements. In addition, the radial gradient index lens elements used in this lens system has spherical shapes, whereby an optical axis of the surfaces and an optical axis of medium can hardly be coincident with each other with high precision in a practical working stage, and the lens system is not preferable from viewpoints of high optical performance and low manufacturing cost.

Though it is conceivable to use a radial type gradient index lens element without working its surface into spherical shapes or in a condition where the lens element has planar surfaces on both sides, such a radial type gradient index lens element is not preferable since it under-corrects a Petzval's sum more remarkably as compared with a case where it has spherical surfaces.

Further, Japanese Patents Kokai Publication No. Sho 58-59420 and No. Hei 4-114112, for example, disclose conventional examples in each of which a radial type gradient index lens element having planar surfaces on both sides is cemented to a planar surface of a homogeneous lens element having a spherical surface on the other side for enlarging freedom for correction of aberrations. However, these conventional examples are pickup lens systems which are to be used under monochromatic light sources and these Japanese Patent Kokai Publications made no reference to correction of chromatic aberration. Japanese Patents Kokai Publication No. Hei 1-28514 and No. Hei 2-284107 which disclose similar conventional examples neither make reference to correction of chromatic aberration.

Furthermore, lens systems disclosed by European Patent Laid-Open No. 609093 and Japanese Patent Kokai Publication No. Sho 58-184113 are known as conventional examples of lens systems each of which is to be used under white light source, and is composed of a radial type gradient index lens element and a homogeneous lens element cemented to each other on planar surfaces. These are conventional examples using the radial type gradient index lens elements in relay lens systems for non-flexible endoscopes and usable only as lens systems such as the relay lens systems for non-flexible endoscopes having narrow field angles since the lens systems have large Petzval's sums and total lengths which are large relative to diameters of the lens systems.

Moreover, a conventional example disclosed by Japanese Patent Kokai Publication No. Sho 50-29238 is known as a lens system which is configured taking chromatic aberration into consideration. However, this conventional example uses radial gradient index lens elements which have refractive indices largely varying from optical axes to marginal portions and made of materials hardly manufactured in practice.

SUMMARY OF THE INVENTION

A primary object of the present invention is to provide a combination lens system which is excellent in workability and applicable to various optical systems used under white light sources, and has favorably corrected aberrations, chromatic aberration and a Petzval's sum in particular.

Another object of the present invention is to provide an image pickup lens system which uses a combination lens system composed of two lens components and has favorable imaging performance.

The combination lens system according to the present invention is characterized in: that it is composed of at least one homogeneous lens element having a negative refractive power and a radial type gradient index lens element which has a positive refractive power and a refractive index distribution from an optical axis in a radial direction; that the radial type gradient index lens element has planar surfaces on both sides; that the homogeneous lens element has, at least on one side, a surface which is partially or entirely planar; that the planar portion of the surface of the homogeneous lens element is cemented or kept to or in close contact to or with a portion of the planar surface of the radial type gradient index lens element; and that combination lens system satisfies the following condition (1):

$$1/V_{10} < 1/v_h \tag{1}$$

The image pickup lens system according to the present invention is characterized in: that it is composed of a homogeneous lens element having a negative refractive power and a radial type gradient index lens element having a positive refractive power; and that the image pickup lens system satisfies the following condition (21):

$$-0.5 < 1/V_{10} < 0.015 \tag{21}$$

BRIEF DESCRIPTION OF THE DRAWINGS

FIGS. 10A and 10B are sectional views illustrating a composition of a tenth embodiment of the present invention;

FIGS. 11 through 14 are sectional views illustrating compositions of eleventh through fourteenth embodiments of the present invention;

FIGS. 19A, 19B and 19C are diagrams exemplifying conventional working of a spherical surface directly on radial type gradient index lens elements;

DETAILED DESCRIPTION OF THE PREFERRED EMBODIMENTS

Figure 1:
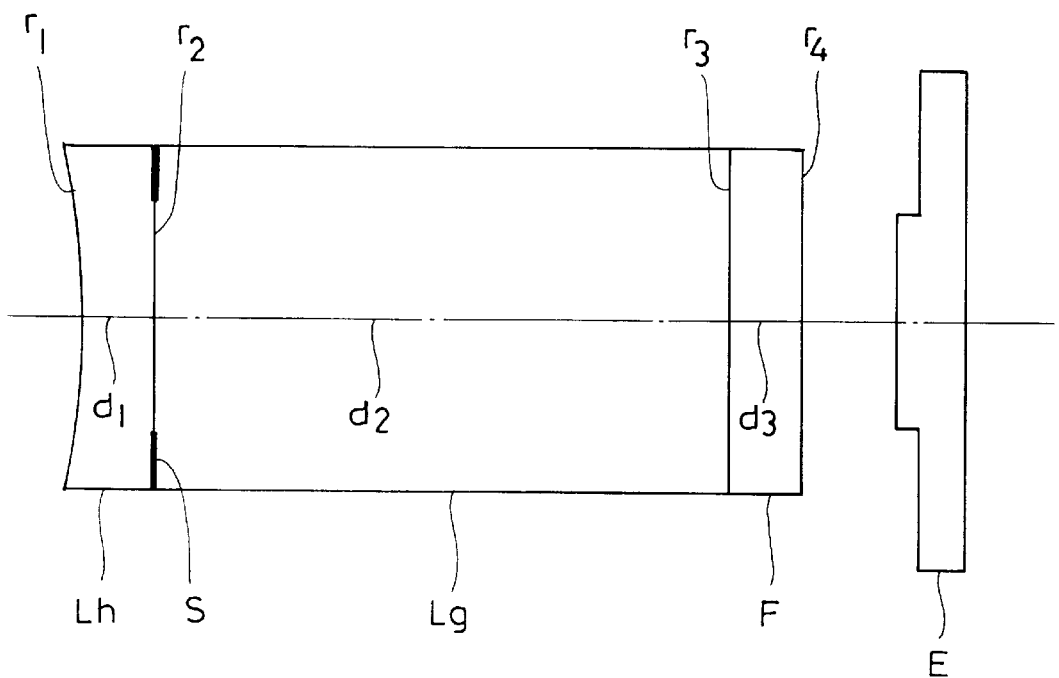
FIG. 1 is a sectional view illustrating a composition of a first embodiment of the present invention.

The combination lens system according to the present invention is characterized in that it is composed of at least one homogeneous lens element having a negative refractive power, and a radial type gradient index lens element which has a positive refractive power and a refractive index distribution from an optical axis in a radial direction expressed by the formula (a) shown below; that the radial type gradient index lens element is shaped so as to have planar surfaces on both sides; that at least one side surface of the homogeneous lens element is partially or entirely planar; that the planar portion of the surface of the homogeneous lens element is cemented or kept to or in close contact with the place surface portion of the radial type gradient index lens element; and that the combination lens system satisfies the following condition (1):

$$N(r) = N_{00} + N_{10}r^2 + N_{20}r^4 \ldots 1/V_{10} < 1/v_h \tag{1(a)}$$

wherein the reference symbol r represents a distance as measured from an optical axis in a radial direction, the reference symbol N(r) designates a refractive index at a point located at the distance r, the reference symbol $N_{i0}$ denotes a refractive index distribution coefficient of the 2i'th order, the reference symbol $V_h$, represents an Abbe's number of the homogeneous lens element, the reference symbol $V_{00}$ designates an Abbe's number on the optical axis given by the formula (b) shown below and the reference symbol $V_{i0}$ denotes a dispersing power corresponding to the refractive index distribution coefficient of the 2i'th order of the radial type gradient index lens element which is given by the following formula (c):

$$V_{0i} = (N_{00d} - 1)/(N_{00F} - N_{00C}) \quad (i=0) \tag{b}$$

$$V_{i0} = N_{i0d}/(N_{i0F} - N_{i0C}) \quad (i=1, 2, 3 \ldots) \tag{c}$$

wherein the reference symbols $N_{00d}$, $N_{00F}$ and $N_{00C}$ represent refractive indices on the optical axis for the d-line, F-line and C-line respectively, and the reference symbols $N_{i0d}$, $N_{i0F}$ and $N_{i0C}$ designate refractive index distribution coefficient of the 2i'th order for the d-line, F-line and C-line respectively.

The combination lens system according to the present invention is configured as a lens unit which is usable as a portion of an optical system to be used under a white light source and is composed as described below. The combination lens system is composed by cementing or bringing a homogeneous lens element having a planar portion on at least one surface to or into close contact with a radial type gradient index lens element having planar surfaces on both sides, and setting refractive powers, Abbe's numbers, etc. of these lens elements at adequate values. When the shape having the planar surfaces on both the sides is selected for the radial type gradient index lens element, it is possible to prevent surfaces and media from being eccentric at a practical working stage and when the homogeneous lens element is cemented or brought to or into close contact with the gradient index lens element, it is possible to correct aberrations favorably. Further, optical axis of the homogeneous lens element can be coincident with that of the gradient index lens element relatively easily with high precision when the homogeneous lens element has the planar surface portion and is cemented or brought to or into close contact with the radial type gradient index lens element. Further, chromatic aberration and a Petzval's sum can be favorably corrected by selecting adequate parameters such as refractive powers and Abbe's numbers for the homogeneous lens element and the radial type gradient index lens element.

Chromatic aberration PAC to be produced by a radial type gradient index lens element can be approximated by the following formula (d):

$$PAC = K(\phi_s/V_{00} + \phi_m/V_{10}) \tag{d}$$

wherein the reference symbol K represents a constant which is dependent on a height of an axial ray and an angle formed by a final paraxial ray relative to the optical axis, and the reference symbols $\phi_s$ and $\phi_m$ designate a refractive power of surface and a refractive power of medium respectively of a thin radial type gradient index lens element.

Further, the refractive power of medium is approximated by the following formula (e):

$$\phi_m \approx -2N_{10} t_G \tag{e}$$

wherein the reference symbol tG represents thickness of the radial type gradient index lens element.

Since the combination lens system according to the present invention uses the gradient index lens element in the shape having the planar surfaces on both the sides, $\phi_s$ is nearly equal to 0 and the formula (d) has the second term only. Further, since the homogeneous lens element is cemented or kept to or in close contact with the gradient index lens element, the combination lens system according to the present invention produces longitudinal chromatic aberration in an amount expressed by the following formula (f):

$$PAC = K(\phi_h/\nu_h + \phi_m/V_{10}) \tag{f}$$

wherein the reference symbols $\phi_h$ and $\nu_h$ represent a refractive power and an Abbe's number respectively of the thin homogeneous lens element which is cemented or kept to or in close contact with the radial type gradient index lens element.

From the formula (f), it will be understood that an amount of longitudinal chromatic aberration can be controlled by varying a value of $V_{10}$. When the combination lens system according to the present invention is to be configured so as to produce longitudinal chromatic aberration in an amount smaller than that of longitudinal chromatic aberration produced by a homogeneous lens element having a refractive power $\phi$ which is the same as that of the combination lens system according to the present invention and an Abbe's number $\nu_h$, it is necessary to satisfy the following formula:

$$K(\phi_h/\nu_h + \phi_m/V_{10}) < K(\phi/\nu_h)$$

wherein the reference symbol $\phi = \phi_m = \phi_h$.

The condition (1) mentioned above is derived from $\phi_m/V_{10} < \phi_m/\nu_h$ which is obtained by developing this formula.

As understood from the foregoing description, longitudinal chromatic aberration can be favorably corrected when the Abbe's number $\nu_h$ of the homogeneous lens element and the Abbe's number $V_{10}$ of medium of the radial type gradient index lens element of the combination lens system satisfy the condition (1). That is to say, the condition (1) is a requisite for favorable correction of longitudinal chromatic aberration in the combination lens system according to the present invention. If the condition (1) is not satisfied, longitudinal chromatic aberration will undesirably be undercorrected in the combination lens system according to the present invention.

For correcting longitudinal chromatic aberration more favorably, it is necessary not only to satisfy the condition (1) but also to share adequate refractive powers between the homogeneous lens element and the radial type gradient index lens element. In sharing refractive powers, however, it is necessary to take into sufficient consideration not only chromatic aberration but also correction of a Petzval's sum since an amount of a Petzval's sum to be produced is determined, like chromatic aberration, dependently on refractive power distribution in the lens system and can hardly be corrected by bending once refractive power distribution is determined.

A petzval's sum PTZ to be produced by a radial type gradient index lens element alone is approximated by the following formula (g):

$$PTZ = \phi_s/N_{00} + \phi_m/N_{00}^2 \tag{g}$$

In case of the combination lens system according to the present invention wherein the radial type gradient index lens element has the planar surfaces on both the sides for enhancing productivity, $\phi_s$ is nearly equal to 0 and the formula (g) has only the second term. Further, since the homogeneous lens element is cemented or kept to or in close contact with the radial type gradient index lens element, a Petzval's sum of the combination lens system according to the present invention is expressed by the following formula (h):

$$PTZ = \phi_h/n_h + \phi_m/N_{00}^2 \tag{h}$$

wherein the reference symbol $n_h$ represents a refractive index of the homogeneous lens element.

As seen from the formula (h) wherein the denominator is squared, a value of a Petzval's sum to be produced by the combination lens system can be reduced by using, in place of a homogeneous lens element, a radial type gradient index lens element having a refractive power which is the same as that of a homogeneous lens element having a refractive power $n_h$.

Now let us consider, on the basis of the formulae (f) and (h), a refractive power distribution adequate for simultaneous correction of longitudinal chromatic aberration and a Petzval's sum in the combination lens system.

When a parameter of ratio between refractive powers of medium given by the following formula (i) is used in the formulae (f) and (h), these formulae are transformed into the following formulae (f') and (h') respectively:

$$a = \phi_m/\phi \quad (\phi = \phi_m + \phi_h) \tag{i}$$

$$PAC = K\phi\{(\nu_h - V_{10})a + V_{10}\}/(\nu_h V_{10}) \tag{f'}$$

$$PTZ = \phi\{(n_h - N_{00}^2)a + N_{00}^2\}/(n_h N_{00}^2) \tag{h'}$$

Figure 16:
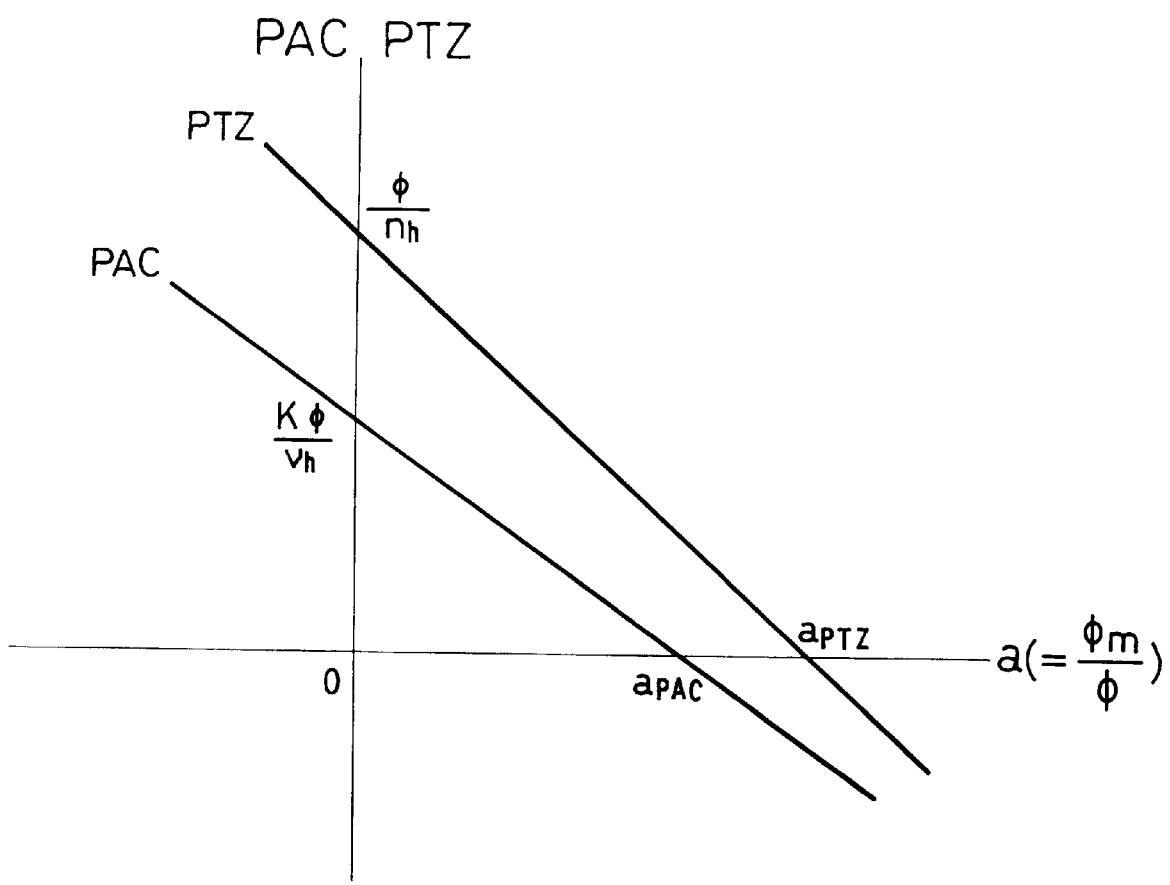
FIG. 16 is a graph visualizing relationship among a ratio between refractive powers of medium, paraxial chromatic aberration and a Petzval's sum.

For easy understanding of relationship of the ratio a between refractive powers of medium versus a Petzval's sum, the formulae (f') and (h') are visualized in forms of graphs in FIG. 16 wherein the abscissa represents the ratio a between refractive powers of medium and the ordinate designates longitudinal chromatic aberration PAC or a Petzval's sum PTZ of the combination lens system. Further, the reference symbols $a_{PAC}$ and $a_{PTZ}$ shown in FIG. 16 represent values of the ratio a between refractive powers of medium at PAC of 0 and at PTZ of 0 respectively which are given by the following formulae (j) and (k) respectively:

$$a_{PAC} = V_{10}/(V_{10} - v_h) \qquad (j)$$

$$a_{PTZ} = N_{00}^2/(N_{00}^2 - n_h) \qquad (k)$$

From FIG. 16, it will be understood that a first requisite for simultaneous correction of longitudinal chromatic aberration and a Petzval's sum is proximity between values of $a_{PAC}$ and $a_{PTZ}$. When values of $a_{PAC}$ and $a_{PTZ}$ have signs different from each other, for example, it is impossible to correct longitudinal chromatic aberration and a Petzval's sum at the same time. When the ratio a between refractive powers of medium has a value close to values of $a_{PAC}$ and $a_{PTZ}$ which are close to each other, it is possible to obtain a combination lens system in which longitudinal chromatic aberration and a Petzval's sum are corrected exteremely favorably.

However, the refractive index $N_{00}$ on the optical axis has a value on the order of 1.5 to 1.9 since the refractive index on the optical axis is not largely different from those of currently available homogeneous glass materials under the present circumstance of manufacturing technology for materials having refractive index distributions. Further, since the homogeneous lens element has a refractive index $n_h$ on the order of 1.5 to 1.9, the formula (k) satisfies the following formula (k'):

$$a_{PTZ} = N_{00}^2/(N_{00}^2 - n_h) > 1 \qquad (k')$$

Since the combination lens system according to the present invention satisfies the condition (1), the formula (j) satisfies the following formula (j'):

$$a_{PAC} = V_{10}/(V_{10} - v_h) > 0 \qquad (j')$$

From this fact, it will be understood that values of $a_{PAC}$ and $a_{PTZ}$ are larger than 0, and the ratio a between refractive powers of medium must have a value larger than 0 when longitudinal chromatic aberration and a Petzval's sum are corrected favorably. Form (k'), it is further desirable that the ratio a between refractive powers of medium has a value larger than 1. In other words, it is desirable that the radial type gradient index lens element and the homogeneous lens element have refractive powers distributed so as to satisfy the relationship expressed by the following formula (i'):

$$\phi_m/(\phi_m + \phi_h) > 1 \qquad (i')$$

When the radial type gradient index lens element and the homogeneous lens element have refractive powers satisfying the formula (i'), it is possible to favorably correct longitudinal chromatic aberration and a Petzval's sum.

Since it is desirable that the combination lens system according to the present invention has a positive refractive power, $\phi_m$ must be larger than 0 and $\phi_h$ must be smaller than 0 for satisfying the formula (i'). In other words, the radial gradient index lens element must have a positive refractive power of medium and the homogeneous lens element must have a negative refractive power. If the homogeneous lens element has a positive refractive power, it will be difficult to favorably correct a Petzval's sum and longitudinal chromatic aberration.

Further, it is desirable that the homogeneous lens element has a negative refractive power which is strong to a certain degree for correcting longitudinal chromatic aberration and a Petzval's sum favorably in the combination lens system according to the present invention. Though a requisite for favorable correction of longitudinal chromatic aberration and a Petzval's sum is that the radial type gradient index lens element has a positive refractive power of medium and the homogeneous lens element has a negative refractive power, it will be difficult to favorably correct a Petzval's sum in particular if the homogeneous lens element has an extremely weak refractive power. It is therefore desirable to satisfy the following condition (2):

$$-2 < f_c/f_h < -0.05 \qquad (2)$$

wherein the reference symbol $f_c$ represents a focal length of the combination lens system and the reference symbol $f_h$ designates a focal length of the homogeneous lens element.

When the combination lens system satisfies the condition (2), a Petzval's sum can be corrected favorably. If the upper limit of −0.05 of the condition (2) is exceeded, a Petzval's sum will be undercorrected thereby undesirably tilting an image surface toward the object side. If the lower limit of −2 of the condition (2) is exceeded, in contrast, a Petzval's sum will be overcorrected, thereby undesirably tilting the image surface aways from the object side.

When the combination lens system according to the present invention is to be disposed in an optical system to be used under a white light source, it is desirable that the combination lens system has a refractive power $\phi$ which is strong to a certain degree since effects of the favorable correction of longitudinal chromatic aberration and a Petzval's sum cannot be effectively utilized when the combination lens system has a weak refractive power. The inventor conceived to strengthen the refractive power $\phi(=\phi_m+\phi_h)$ while correcting longitudinal chromatic aberration and a Petzval's sum. The refractive power $\phi$ can be strengthened by strengthening the positive refractive power of the radial type gradient index lens element or weakening the negative refractive power of the homogeneous lens element. For correction of a Petzval's sum in particular, it is undesirable to weaken the negative refractive power of the homogeneous lens element as described above. Accordingly, the inventor conceived to strengthen the positive refractive power of the radial type gradient index lens element. As judged from the formula (e), it is necessary for strengthening the refractive power of medium to enlarge $N_{10}$ or $t_G$. However, it is difficult to manufacture a gradient index material which has an extremely large $N_{10}$. For configuring the radial type gradient index lens element so as to have adequate thickness so that the combination lens system will have a sufficiently strong refractive power without extremely enlarging $N_{10}$, it is desirable to satisfy the following condition (3):

$$0.1 < t_G/f_T < 7 \qquad (3)$$

wherein the reference symbol $f_T$ represents a focal length of an optical system in which the combination lens system is to be disposed, or a focal length at a wide position in particular when the combination lens system is to be disposed in a zoom lens system.

So far as condition (3) is satisfied, it is possible to effectively utilize the effect for correcting longitudinal chromatic aberration and a Petzval's sum when the combination lens system according to the present invention is disposed in an optical system. If the lower limit of 0.1 of the condition (3) is exceeded, the combination lens system will have a weak refractive power, thereby making it difficult to effectively utilize the effect for correcting longitudinal chromatic aberration and a Petzval's sum. If the upper limit of 7 of the condition (3) is exceeded, in contrast, the the radial type gradient index lens element will be thick and require a high manufacturing cost.

For using the combination lens system according to the present invention in a lens system which requires higher imaging performance, it is desirable to satisfy, in place of the condition (3), the following condition (4):

$$0.25 < t_G/f_T < 5.5 \quad (4)$$

If the lower limit of 0.25 of the condition (4) is exceeded, the combination lens system will have a weak refractive power, thereby making it difficult to effectively utilize the effect for correcting longitudinal chromatic aberration and a Petzval's sum in the lens system which requires high imaging performance. If the upper limit of 5.5 of the condition (4) is exceeded, in contrast, the gradient index lens element will be thick, and aggravate transmittance and flare, thereby making it difficult to obtain high imaging performance.

For correcting longitudinal chromatic aberration more favorably in an optical system with the combination lens system according to the present invention, it is desirable to configure the radial type gradient index lens element so as to satisfy the following condition (5):

$$-0.05 < 1/V_{10} < 0.012 \quad (5)$$

When the radial type gradient index lens element satisfies the condition (5), it is possible to correct longitudinal chromatic aberration more favorably. If the upper limit of 0.012 of the condition (5) is exceeded, longitudinal chromatic aberration will undesirably be undercorrected. If the lower limit of -0.05 of the condition (5) is exceeded, in contrast, longitudinal chromatic aberration will undesirably be overcorrected.

For using the combination lens system according to the present invention in an optical system for which correction of chromatic aberration in particular is important such as an objective lens system for microscopes, it is desirable to configure the radial type gradient index lens element so as to satisfy, in place of the condition (5), the following condition (6):

$$-0.03 < 1/V_{10} < 0.008 \quad (6)$$

When the radial type gradient index lens element satisfies the condition (6), the combination lens system according to the present invention is usable in an optical system for which correction of longitudinal chromatic aberration is important in particular. If the upper limit of 0.008 of the condition (6) is exceeded, longitudinal chromatic aberration will undesirably be undercorrected. If the lower limit of -0.03 of the condition (6) is exceeded, in contrast, longitudinal chromatic aberration will undesirably be overcorrected.

Further, an amount of spherical aberration to be produced can be controlled by varying a value of the term $N_{20}$ of the fourth order of refractive index distribution. For correcting spherical aberration favorably in the combination lens system according to the present invention, it is desirable to configure the radial type gradient index lens element so as to satisfy the following condition (7):

$$-0.6 < N_{20} \times f_T^4 < 0.6 \quad (7)$$

When the radial type gradient index lens element satisfies the condition (7), it is possible to correct spherical aberration favorably. If the upper limit of 0.6 of the condition (7) is exceeded, spherical aberration will undesirably be overcorrected. If the lower limit of -0.6 of the condition (7) is exceeded, in contrast, spherical aberration will undesirably be undercorrected.

For using the combination lens system according to the present invention in a lens system which requires higher imaging performance, it is desirable to configure the radial type gradient index lens element so as to satisfy, in place of the condition (7), the following condition (8):

$$-0.4 < N_{20} \times f_T^4 < 0.4 \quad (8)$$

When the radial type gradient index lens element satisfies the condition (8), it is possible to correct spherical aberration more favorably. If the upper limit of 0.4 of the condition (8) is exceeded, spherical aberration will be overcorrected, thereby undesirably making it impossible to obtain high imaging performance. If the lower limit of -0.4 of the condition (8) is exceeded, in contrast, spherical aberration will be undercorrected, thereby undesirably making it impossible to obtain high imaging performance.

Though it is possible to reduce an amount of longitudinal chromatic aberration to be produced in the combination lens system according to the present invention by configuring it so as to satisfy the condition (1), it is desirable for correcting lateral chromatic aberration in addition to longitudinal chromatic aberration to configure the homogeneous lens element so as to satisfy the following condition (9):

$$1/v_h < 0.025 \quad (9)$$

Since heights of offaxial rays are different between the homogeneous lens element and the radial type gradient index lens element which compose the combination lens system according to the present invention, it is desirable that each of the lens elements produces chromatic aberration in a small amount. When the homogeneous lens element satisfies the condition (9), it is possible to favorably correct lateral chromatic aberration in addition to longitudinal chromatic aberration. If the condition (9) is not satisfied, lateral chromatic aberration will be undercorrected.

For correcting a Petzval's sum more favorably in the combination lens system according to the present invention, it is desirable to satisfy the following condition (10):

$$N_{00d} > 1.55 \quad (10)$$

When the condition (10) is satisfied, the second term of the formula (h) has a smaller value, thereby making it possible to sufficiently reduce a Petzval's sum to be produced by a medium of the radial type gradient index lens element. If the condition (10) is not satisfied, a Petzval's sum produced by a medium of the radial type gradient index lens element will undesirably be undercorrected.

Further, it is possible to obtain a high performance combination lens system by using an optical element which has an effect of a low pass filter or a band cut filter as the homogeneous lens element or the radial type gradient index lens element in the combination lens system according to the present invention.

Furthermore, it is possible to correct aberrations more favorably by configuring the homogeneous lens element so as to have an aspherical surface.

For manufacturing the combination lens system according to the present invention at a low cost, it is desirable that the homogeneous lens element has a concave surface and a planar surface. A homogeneous lens element which has a planar surface on one side can be polished extremely easily and worked at a low cost.

It is possible to correct aberrations, chromatic aberration and a Petzval's sum in particular, more favorably in the combination lens system according to the present invention by cementing or bringing homogeneous lens elements to or into close contact with both side surfaces of the radial type gradient index lens element.

For facilitating to align the optical axis of the homogeneous lens element with that of the radial type gradient index lens element with high precision, it is desirable to configure at least one side surface of the homogeneous lens element so as to be partially or entirely planar and cement or bring the planar surface portion to or into close contact with the radial type gradient index lens element. It is possible to easily align the optical axes of these lens elements with high precision, for example, by configuring both the lens elements so as to have an equal outside diameter and cementing or bringing these lens elements to or in close contact with each other on the planar surface portion. As another means, it is possible to measure a location or locations of either or both of the homogeneous lens elements and the radial type gradient index lens element, adjust positions of the lens elements so as to align the optical axes of the lens elements and cement or bring the lens element to or into close contact with each other. In this case, the adjustment is extremely facilitated when both the lens elements have planar surface portions and are in contact with each other on the planar surface portions. Cementing or bringing the lens elements to or into close contact each other provides a merit that a lens barrel structure can be simplified. Similar effects for enhancing workability and aberration correcting efficiency can be obtained by interposing a ring for airspace adjustment (a spacer) or a thin sheet functioning as a stop between the homogeneous lens element and the radial type gradient index lens element.

Now, description will be made of embodiments (first through seventeenth embodiments) of the combination lens system according to the present invention.

The combination lens system according to the present invention is used in various kinds of optical systems. For example, the third embodiment is used in an objective lens system for wide-angle endoscopes, the fifth embodiment is adopted for an objective lens system for microscopes and the sixth embodiment is applied to a zoom lens system. Further, the combination lens system according to the present invention can be used in a pair as in the fourth embodiment.

The embodiments of the combination lens system according to the present invention have numerical data which are listed below:

Embodiment 1

$f_T = 4.2$,  F number 2.0,  $2\omega = 42°$ $r_1 = -10.4898$
  $d_1 = 1.0000$  $n_1 = 1.48749$  $v_1 = 70.21$
$r_2 = \infty$
  $d_2 = 8.0000$  $n_2$ (gradient index lens element)
$r_3 = \infty$
  $d_3 = 1.0000$  $n_3 = 1.51633$  $v_3 = 64.15$
$r_4 = \infty$ gradient index lens element

| | $N_{00}$ | $N_{10}$ | $N_{20}$ |
|---|---|---|---|
| d line | 1.75000, | $-0.19934 \times 10^{-1}$, | $-0.28601 \times 10^{-4}$ |
| C line | 1.74500, | $-0.19904 \times 10^{-1}$, | $-0.28557 \times 10^{-4}$ |
| F line | 1.76167, | $-0.20005 \times 10^{-1}$, | $-0.28703 \times 10^{-4}$ |

$1/V_{10} = 0.005$, $1/v_h = 0.014$, $f_C/f_h = -0.195$,
$t_G/f_T = 1.905$, $N_{20} \times f_T^4 = -0.009$

Embodiment 2

$f_T = 4.88$,  F number 3.5,  $2\omega = 28.6°$ $r_1 = 10.1312$
  $d_1 = 1.8000$  $n_1 = 1.84666$  $v_1 = 23.78$
$r_2 = 4.3922$ (aspherical surface)
  $d_2 = 0.5000$
$r_3 = \infty$
  $d_3 = 8.0000$  $n_2$ (gradient index lens element)
$r_4 = \infty$
  $d_4 = 1.0000$  $n_3 = 1.51633$  $v_3 = 64.15$
$r_5 = \infty$ aspherical surface coefficients $P = 1$,  $A_4 = -0.63278 \times 10^{-2}$,  $A_6 = 0.38524 \times 10^{-2}$,
$A_8 = -0.12709 \times 10^{-2}$ gradient index lens element

| | $N_{00}$ | $N_{10}$ | $N_{20}$ |
|---|---|---|---|
| d line | 1.75000, | $-0.19934 \times 10^{-1}$, | $-0.28601 \times 10^{-4}$ |
| C line | 1.74500, | $-0.19904 \times 10^{-1}$, | $-0.28557 \times 10^{-4}$ |
| F line | 1.76167, | $-0.20005 \times 10^{-1}$, | $-0.28703 \times 10^{-4}$ |

$1/V_{10} = 0.005$, $1/v_h = 0.042$, $f_C/f_h = -0.456$,
$t_G/f_T = 1.641$, $N_{20} \times f_T^4 = -0.016$

Embodiment 3

$f_T = 0.844$,  NA = 0.011,  $2\omega = 129.2°$
objects distance  11 mm $r_1 = \infty$
  $d_1 = 0.3600$  $n_1 = 1.88300$  $v_1 = 40.78$
$r_2 = 0.6800$
  $d_2 = 0.8000$
$r_3 = \infty$
  $d_3 = 3.8000$  $n_2$ (gradient index lens element)
$r_4 = \infty$
  $d_4 = 2.8000$  $n_3 = 1.51633$  $v_3 = 64.15$
$r_5 = \infty$ gradient index lens element

| | $N_{00}$ | $N_{10}$ | $N_{20}$ | $N_{30}$ |
|---|---|---|---|---|
| d line | 1.70000, | $-0.12580$, | $0.78000 \times 10^{-2}$, | $-0.47000 \times 10^{-3}$ |
| C line | 1.69475, | $-0.12567$, | $0.77922 \times 10^{-2}$, | $-0.46953 \times 10^{-3}$ |
| F line | 1.71225, | $-0.12609$, | $0.78182 \times 10^{-2}$, | $-0.47110 \times 10^{-3}$ |

$1/V_{10} = 0.003$, $1/v_h = 0.025$, $f_C/f_h = -1.096$,
$t_G/f_T = 4.502$, $N_{20} \times f_T^4 = 0.004$

Embodiment 4 magnification  10x,  image height  13.25 mm,
NA = 0.3, WD = 8.2368 mm $r_1 = -15.1221$
  $d_1 = 2.1659$  $n_1 = 1.48749$  $v_1 = 70.21$
$r_2 = \infty$
  $d_2 = 11.4031$  $n_2$ (gradient index lens element 1)

-continued

Embodiment 4

| | | | |
|---|---|---|---|
| $r_3 = \infty$ | | | |
| | $d_3 = 14.6902$ | | |
| $r_4 = -15.1221$ | | | |
| | $d_4 = 2.1659$ | $n_3 = 1.48749$ | $\nu_3 = 70.21$ |
| $r_5 = \infty$ | | | |
| | $d_5 = 6.2606$ | $n_4$ (gradient index lens element 2) | |
| $r_6 = \infty$ | | | | gradient index lens element 1

| | $N_{00}$ | $N_{10}$ | $N_{20}$ | $N_{30}$ |
|---|---|---|---|---|
| d line | 1.74320, | $-0.44065 \times 10^{-2}$, | $0.15976 \times 10^{-5}$, | $-0.10847 \times 10^{-8}$ |
| C line | 1.73865, | $-0.44012 \times 10^{-2}$, | $0.15955 \times 10^{-5}$, | $-0.10826 \times 10^{-8}$ |
| F line | 1.75372, | $-0.44190 \times 10^{-2}$, | $0.16028 \times 10^{-5}$, | $-0.10880 \times 10^{-8}$ | gradient index lens element 2

| | $N_{00}$ | $N_{10}$ | $N_{20}$ | $N_{30}$ |
|---|---|---|---|---|
| d line | 1.74320, | $-0.27110 \times 10^{-2}$, | $0.41329 \times 10^{-5}$, | $0.33007 \times 10^{-8}$ |
| C line | 1.73865, | $-0.27005 \times 10^{-2}$, | $0.41183 \times 10^{-5}$, | $0.32896 \times 10^{-8}$ |
| F line | 1.75372, | $-0.27356 \times 10^{-2}$, | $0.41669 \times 10^{-5}$, | $0.33284 \times 10^{-8}$ | combination lens $1/V_{10} = 0.004$, $1/\nu_h = 0.014$, $f_C/f_h = -0.449$,
$t_G/f_T = 0.723$, $N_{20} \times f_T^4 = 0.099$ combination lens $1/V_{10} = 0.013$, $1/\nu_h = 0.014$, $f_C/f_h = -7.118$,
$t_G/f_T = 0.397$, $N_{20} \times f_T^4 = 0.256$

Embodiment 5 magnification 20×, image height 10.5 mm,
NA = 0.4, WD = 1.06 mm

| | | | |
|---|---|---|---|
| $r_1 = \infty$ | | | |
| | $d_1 = 21.6063$ | $n_1$ (gradient index lens element) | |
| $r_2 = \infty$ | | | |
| | $d_2 = 1.5278$ | $n_2 = 1.48749$ | $\nu_2 = 70.21$ |
| $r_3 = 5.3752$ | | | |
| | $d_3 = 1.9921$ | | |
| $r_4 = -3.7704$ | | | |
| | $d_4 = 5.7047$ | $n_3 = 1.54814$ | $\nu_3 = 45.78$ |
| $r_5 = -6.7479$ | | | |
| | $d_5 = 0.1000$ | | |
| $r_6 = -15.9975$ | | | |
| | $d_6 = 11.3836$ | $n_4 = 1.88300$ | $\nu_4 = 40.78$ |
| $r_7 = -20.0917$ | | | | gradient index lens element

| | $N_{00}$ | $N_{10}$ | $N_{20}$ | $N_{30}$ |
|---|---|---|---|---|
| d line | 1.67000, | $-0.73239 \times 10^{-2}$, | $0.13526 \times 10^{-4}$, | $-0.10734 \times 10^{-7}$ |
| C line | 1.66521, | $-0.73091 \times 10^{-2}$, | $0.13499 \times 10^{-4}$, | $-0.10712 \times 10^{-7}$ |
| F line | 1.68117, | $-0.73583 \times 10^{-2}$, | $0.13590 \times 10^{-4}$, | $-0.10785 \times 10^{-7}$ |

$1/V_{10} = 0.007$, $1/\nu_h = 0.014$, $f_C/f_h = -0.469$,
$t_G/f_T = 2.303$, $N_{20} \times f_T^4 = 0.105$

Embodiment 6

$f_T = 8.99 \sim 23.54 \sim 72.01$, F number $2.0 \sim 2.0 \sim 2.0$,
$2\omega = 51° \sim 20° \sim 6.4°$

| | | | |
|---|---|---|---|
| $r_1 = 56.9216$ | | | |
| | $d_1 = 1.8000$ | $n_1 = 1.84666$ | $\nu_1 = 23.78$ |
| $r_2 = 37.1745$ | | | |
| | $d_2 = 5.5000$ | $n_2 = 1.61800$ | $\nu_2 = 63.39$ |
| $r_3 = 411.4915$ | | | |
| | $d_3 = 0.2000$ | | |
| $r_4 = 35.4817$ | | | |
| | $d_4 = 4.2000$ | $n_3 = 1.49700$ | $\nu_3 = 81.61$ |
| $r_5 = 70.4018$ | | | |
| | $d_5 = D_1$ (variable) | | |
| $r_6 = 78.8955$ | | | |
| | $d_6 = 1.0000$ | $n_4 = 1.61800$ | $\nu_4 = 63.39$ |
| $r_7 = 10.1490$ | | | |
| | $d_7 = 5.4000$ | | |
| $r_8 = -39.8780$ | | | |
| | $d_8 = 1.0000$ | $n_5 = 1.61800$ | $\nu_5 = 63.39$ |
| $r_9 = 50.0629$ | | | |
| | $d_9 = 0.2000$ | | |
| $r_{10} = 18.0611$ | | | |
| | $d_{10} = 2.8700$ | $n_6 = 1.83350$ | $\nu_6 = 21.00$ |
| $r_{11} = 32.1135$ | | | |
| | $d_{11} = D_2$ (variable) | | |
| $r_{12} = \infty$ (stop) | | | |
| | $d_{12} = 6.0000$ | | |
| $r_{13} = 43.3128$ | | | |
| | $d_{13} = 4.4001$ | $n_7 = 1.74100$ | $\nu_7 = 52.65$ |
| $r_{14} = -124.7618$ | | | |
| | $d_{14} = 1.0000$ | | |
| $r_{15} = -88.9910$ | | | |
| | $d_{15} = 3.3028$ | $n_8 = 1.69895$ | $\nu_8 = 30.12$ |
| $r_{16} = \infty$ | | | |
| | $d_{16} = 2.5105$ | $n_9$ (gradient index lens element) | |
| $r_{17} = \infty$ | | | |
| | $d_{17} = D_3$ (variable) | | |
| $r_{18} = 42.7284$ | | | |
| | $d_{18} = 1.8000$ | $n_{10} = 1.78472$ | $\nu_{10} = 25.71$ |
| $r_{19} = 15.7567$ | | | |
| | $d_{19} = 7.8648$ | $n_{11} = 1.72916$ | $\nu_{11} = 54.68$ |
| $r_{20} = -45.1076$ | | | |
| | $d_{20} = D_4$ (variable) | | |
| $r_{21} = \infty$ | | | |
| | $d_{21} = 5.0000$ | $n_{12} = 1.51633$ | $\nu_{12} = 64.15$ |
| $r_{22} = \infty$ | | | | gradient index lens element

| | $N_{00}$ | $N_{10}$ | $N_{20}$ | $N_{30}$ |
|---|---|---|---|---|
| d line | 1.70000, | $-0.26527 \times 10^{-2}$, | $0.39061 \times 10^{-5}$, | $0.59043 \times 10^{-8}$ |
| C line | 1.69618, | $-0.26649 \times 10^{-2}$, | $0.39061 \times 10^{-5}$, | $0.59043 \times 10^{-8}$ |
| F line | 1.70891, | $-0.26242 \times 10^{-2}$, | $0.39061 \times 10^{-5}$, | $0.59043 \times 10^{-8}$ |

| f | 8.99 | 23.54 | 72.01 |
|---|---|---|---|
| $D_1$ | 1.5 | 23.327 | 39.68 |
| $D_2$ | 40.187 | 18.356 | 2.0 |
| $D_3$ | 8.242 | 5.421 | 9.347 |
| $D_4$ | 3.195 | 6.018 | 2.092 |

$1/V_{10} = -0.015$, $1/\nu_h = 0.033$, $f_C/f_h = -1.378$,
$t_G/f_T = 0.279$, $N_{20} \times f_T^4 = 0.026$

Embodiment 7

$f_T = 1.18$, NA = 0.01, $2\omega = 74.8°$,
object distance 15 mm

| | | | |
|---|---|---|---|
| $r_1 = \infty$ | | | |
| | $d_1 = 0.3000$ | $n_1 = 1.51633$ | $\nu_1 = 64.15$ |
| $r_2 = 1.1693$ | | | |
| | $d_2 = 0.3000$ | | |
| $r_3 = \infty$ | | | |
| | $d_3 = 1.5926$ | $n_2$ (gradient index lens element) | |
| $r_4 = \infty$ | | | |
| | $d_4 = 0.8325$ | $n_3 = 1.51633$ | $\nu_3 = 64.15$ |
| $r_5 = -0.9417$ (aspherical surface) | | | |

-continued

Embodiment 7 aspherical surface coefficients $P = 1, A_4 = 0.38208, A_6 = -0.87563, A_8 = 0.10053 \times 10$ gradient index lens element

|        | $N_{00}$ | $N_{10}$  | $N_{20}$  | $N_{30}$ |
|--------|----------|-----------|-----------|----------|
| d line | 1.62000, | −0.17530, | −0.18627, | 0.74637  |
| C line | 1.61628, | −0.17530, | −0.18627, | 0.74638  |
| F line | 1.62868, | −0.17529, | −0.18626, | 0.74635  |

$1/V_{10} = 0.000, 1/v_h = 0.016, f_C/f_h = -1.764,$
$t_G f_T = 1.353, N_{20} \times f_T^4 = -0.358$ wherein the reference symbols $r_1, r_2, \ldots$ represent radii of curvature on surfaces of respective lens elements, the reference symbols $d_1, d_2, \ldots$ designate thicknesses of the respective lens elements and an airspace reserved therebetween, the reference symbols $n_1, n_2, \ldots$ denote refractive indices of the respective lens elements for the d-line, and the reference symbols $v_1, v_2, \ldots$ represent Abbe's numbers of the respective lens elements.

The first embodiment of the present invention has a composition illustrated in FIG. 1. Speaking concretely, the first embodiment is a combination lens system composed, in order from the object side, of a first negative homogeneous lens element $L_h$ and a second positive lens element which is a radial type gradient index lens element $L_g$ having planar surfaces on both sides. The first negative lens element has a concave object side surface and a planar image side surface which is cemented or kept to or in close contact with the radial type gradient index lens element. A stop S is interposed between the homogeneous lens element $L_h$ and the radial type gradient index lens element $L_g$ for lowering offaxial rays passing through the lens system, thereby reducing a diameter of the combination lens system.

The combination lens system preferred as the first embodiment is usable as a portion of an optical system which is used under white light sources, for example, an objective lens system for silver salt cameras and microscopes. When a solid-stage image pickup device is disposed at a location of an image surface, the combination lens system is usable as an image pickup system, for example, in TV telephone or an interphone. The first embodiment is an example wherein the combination lens system is used as an image pickup system, a filter F for cutting out components having specific wavelengths is cemented or kept to or in close contact with an image side surface of the radial type gradient index lens element and a solid-state image pickup device E is disposed at a location of an image surface.

It is unnecessary to use the filter F in the composition shown in FIG. 1 when the radial type gradient index lens element or the homogeneous lens element has a function to cut off the components having the specific wavelengths.

In the first embodiment wherein the homogeneous lens element $L_h$ has the negative refractive power, the radial type gradient index lens element $L_g$ is configured so as to have a small value of $1/V_{10}$ for favorably correcting longitudinal chromatic aberration.

The combination lens system according to the present invention has a merit that it is more excellent in correction of spherical aberration in particular than a combination lens system wherein a spherical surface is formed directly on the radial type gradient index lens element $L_g$. When a concave surface is formed directly on the radial type gradient index lens element, this surface has a refractive index which is progressively lowered as portions of the surface are farther from an optical axis, or a function to weaken the negative refractive power, thereby reducing an amount of positive spherical aberration to be produced by the surfaces. Accordingly, negative spherical aberration is produced in total. In contrast, the combination lens system according to the present invention allows the surfaces to produce spherical aberration in an amount of approximately 0, is free from such a problem and can correct spherical aberration favorably in the lens system as a whole.

In the first embodiment wherein the stop S is disposed between the homogeneous lens element $L_h$ and the radial type gradient index lens element $L_g$, the homogeneous lens element is made of a glass material having a low dispersing power satisfying $1/v_h < 0.02$. Accordingly, the first embodiment is capable of favorably correcting not only longitudinal chromatic aberration but also lateral chromatic aberration.

Figure 17:
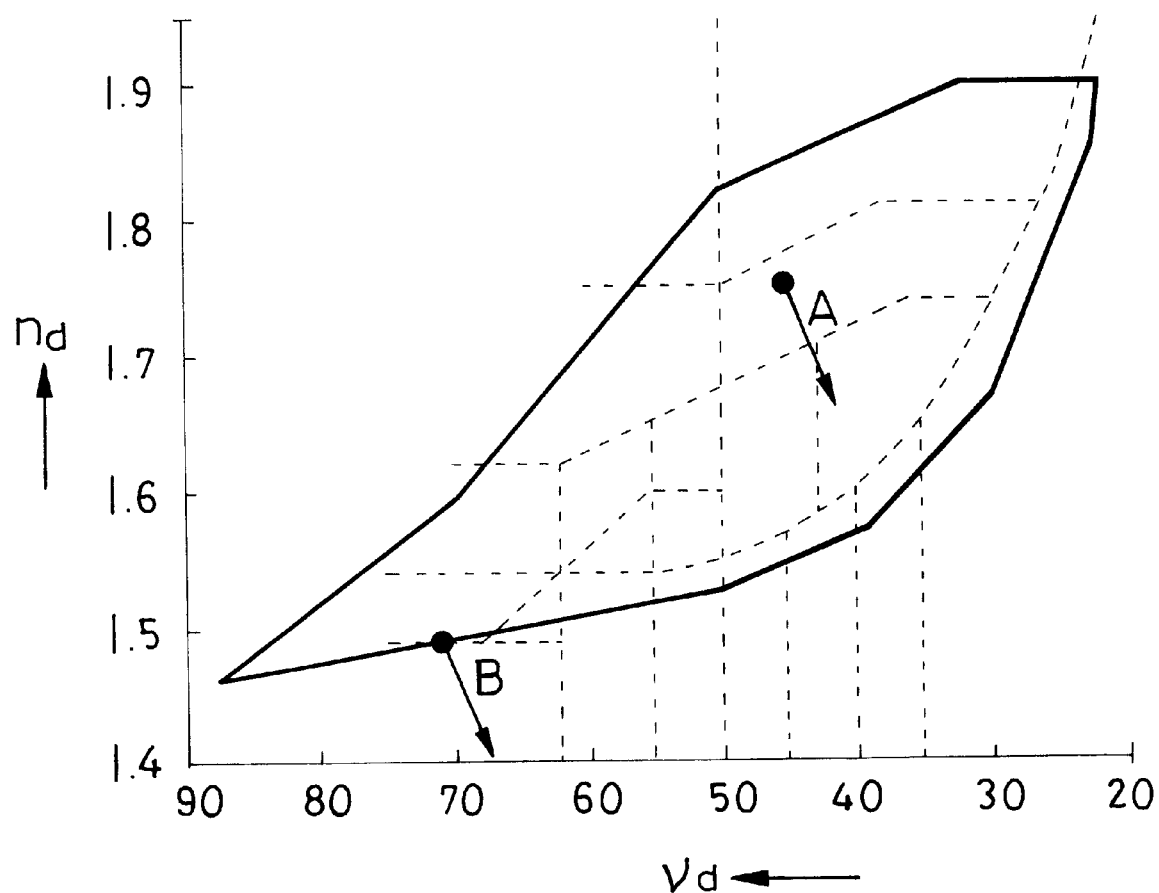
FIG. 17 is a graph illustrating a refractive index-Abbe's number distribution in a glass material.

Further, the combination lens system according to the present invention has a characteristic which is more excellent also in correction of chromatic aberration than a lens system using a spherical surface formed directly on a lens element. FIG. 17 shows a glass map wherein the ordinate represents a refractive index, the abscissa designates an Abbe's number, a thick line enclosure indicates an approximate range of refractive indices and Abbe's numbers of currently available glass materials, arrows indicate variations of a refractive index and an Abbe's number of a radial type gradient index lens element, and black spots denote refractive indices and Abbe's numbers on optical axes. Values of refractive indices and Abbe's numbers of materials for radial type gradient index lens elements which are manufactured, for example, by the ion-exchange method and sol-gel method are distributed, under the current circumstances of manufacturing technologies, within the range of refractive indices and Abbe's numbers of the currently available glass materials as indicated by the arrow A in FIG. 17, and the refractive index and the Abbe's number on the optical axis which are indicated by the arrow B in FIG. 17, for example, are within the range of the refractive indices and Abbe's numbers of the currently available glass materials. It is therefore very difficult to obtain a material for a radial type gradient index lens element having a refractive index and an Abbe's number which deviate from the range of the refractive indices and Abbe's numbers of the currently available glass materials as portions of the radial type gradient index lens element are farther from the optical axis toward a marginal portion. However, it may be desired to obtain such a material for correcting aberrations. A material indicated by the arrow B, for example, has a low dispersing power and is advantageous for correcting chromatic aberration.

The combination lens system according to the present invention makes it possible, with a radial type gradient index lens element made of a refractive index within the range of the refractive indices of the currently available glass materials, to obtain effects which are similar to those obtainable with a material which has a refractive index distribution deviating from the range of the refractive indices of the currently available glass materials. This fact will be described concretely with reference to the first embodiment. The arrow A indicates the radial type gradient index lens element used in the first embodiment which has $N_{00}$ of 1.75, $V_{00}$ of 45 and $V_{10}$ of approximately 200. Longitudinal chromatic aberration $PAC_A$ to be produced by this radial type gradient index lens element is expressed by the following formula:

$$PAC_A = K(\phi_s/45 + \phi_m/200)$$

Further, longitudinal chromatic aberration $PAC_B$ indicated by the arrow B is expressed by the following formula:

$$PAC_B = K(\phi_s/70.21 + \phi_m/200) \qquad (5)$$

The first embodiment which is composed of a homogeneous lens element having $n_h$ of 1.48749 and $\nu_h$ of 70.21, and a radial type gradient index lens element. This combination lens system produces longitudinal chromatic aberration $PAC_C$ expressed by the following formula:

$$PAC_C = K(\phi_h/70.21 + \phi_m/200)$$

By selecting a refractive power for the homogeneous lens element so as to obtain $\phi_h \approx \phi_s$, it is therefore possible to obtain a combination lens system having a chromatic aberration correcting effect similar to that obtainable with a material indicated by the arrow B which can hardly be manufactured in practice.

The combination lens system according to the present invention has a merit to permit enlarging freedom for correction of aberrations by selecting a predetermined homogeneous lens element.

The combination lens system preferred as the first embodiment corrects aberrations favorably though it is composed only of the two lens elements.

Figure 2A:
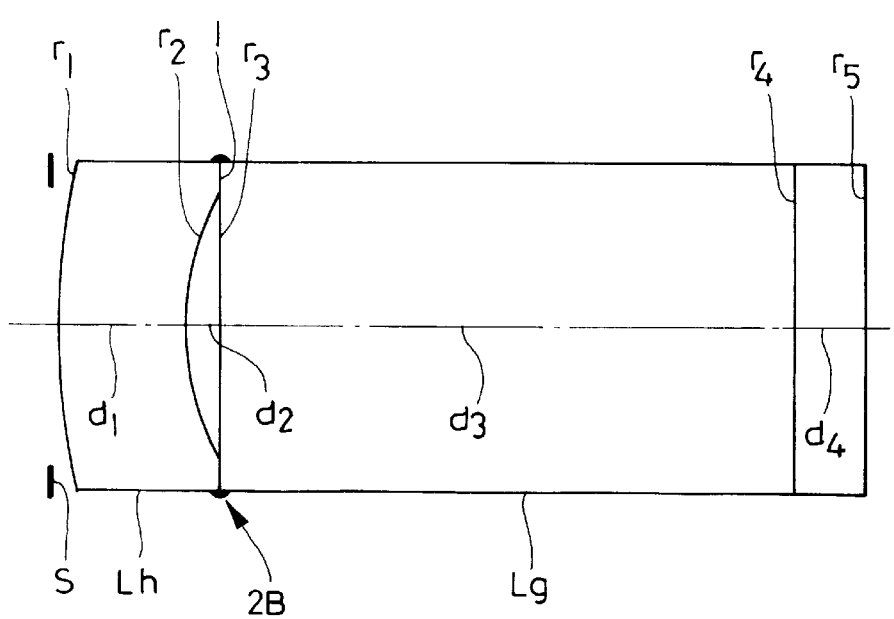
FIGS. 2A and 2B are sectional views illustrating a composition of a second embodiment of the present invention.

The second embodiment of the present invention has a composition illustrated in FIG. 2A. Speaking concretely, the second embodiment is a combination lens system composed, in order from the object side, of a first negative lens element and a second positive lens element which is a radial type gradient index lens element having two planar surfaces. The first lens element is a meniscus lens element having a concave image side surface shaped so as to form, outside an effective diameter, a planar surface portion 1 which is cemented or kept to or in close contact with the radial type gradient index lens element.

Figure 18:
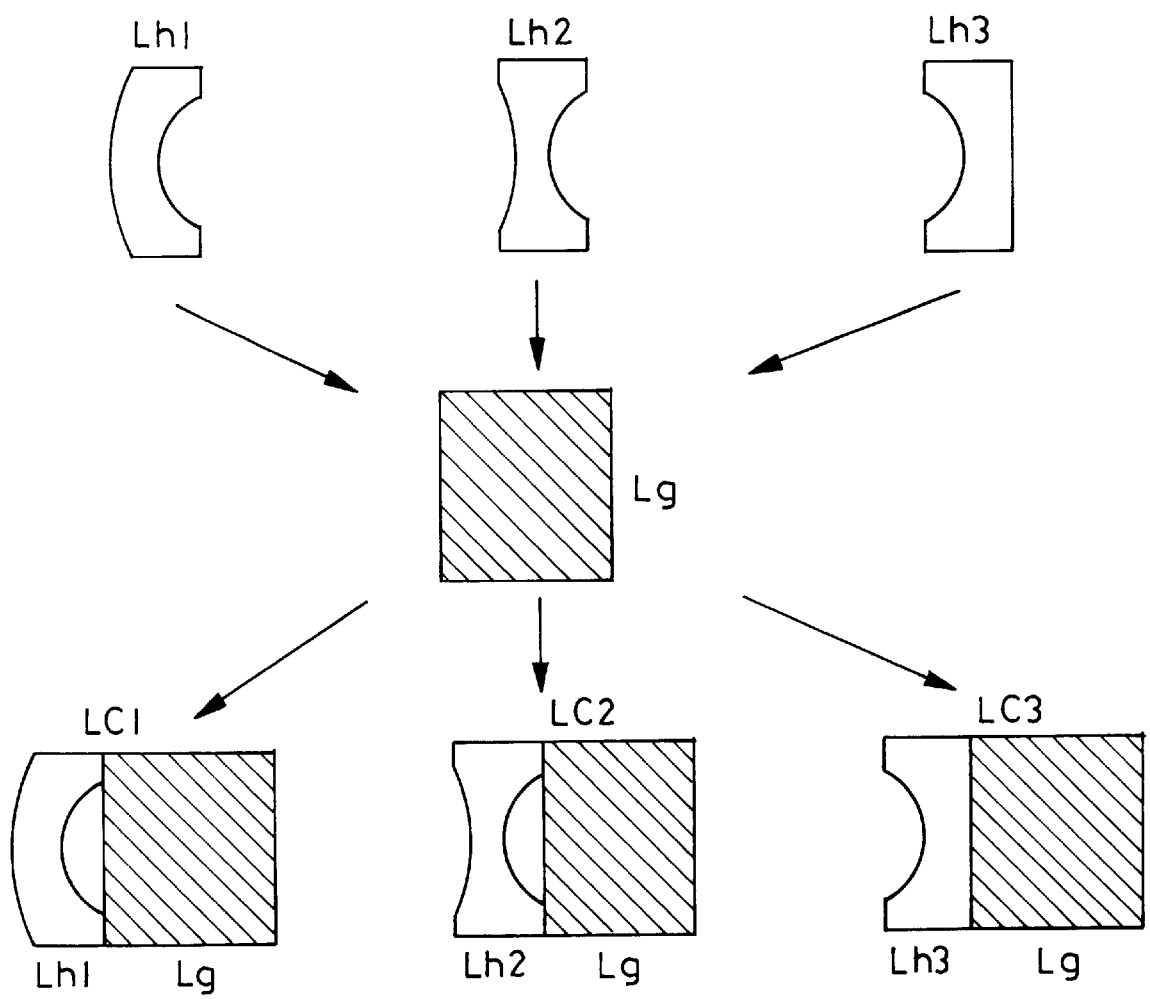
FIG. 18 is a diagram exemplifying combinations of radial type gradient index lens elements and homogeneous lens lens elements.

The second embodiment is an example of combination lens system having a focal length which is varied by combining a homogeneous meniscus lens element, in place of the homogeneous lens element used in the first embodiment, with the radial type gradient index lens element $L_g$ adopted for the first embodiment. That is to say, the combination lens system according to the present invention can be modified into a combination lens system $L_{C1}$, $L_{C2}$ or $L_{C3}$ which has a different focal length and produces aberrations in different amounts by combining the radial type gradient index lens element $L_g$ with a homogeneous lens element, for example $L_{h1}$, $L_{h2}$ or $L_{h3}$ having different r, d and n as shown in FIG. 18. Since the radial type gradient index lens element is usable commonly, the combination lens system which is applicable to various lens systems to be used under a white light sources can be manufactured at a low cost.

The stop S which is disposed on the object side of the homogeneous lens element $L_h$ makes it possible to favorably correct offaxial aberrations in particular.

Since longitudinal chromatic aberration in particular can hardly be corrected in the second embodiment which has a focal length longer than that of the first embodiment, the homogeneous lens element has an Abbe's number satisfying $1/\nu_h > 0.03$ in the second embodiment.

Further, an aspherical surface is used as an image side surface of the homogeneous lens element to favorably correct aberrations. The aspherical surface used in the second embodiment has a shape expressed by the following formula (m):

$$x = \frac{y^2/r}{1 + \sqrt{1 - P(y/r)^2}} + \sum_{i=1}^{n} A_{2i} y^{2i} \qquad (m)$$

wherein a direction along the optical axis is taken as the x axis, a direction perpendicular to the optical axis is taken as the y axis, the reference symbol r represents a radius of curvature on the optical axis, the reference symbol P designates a conical constant and the reference symbol $A_{2i}$ denotes an aspherical surface coefficient.

Figure 2B:
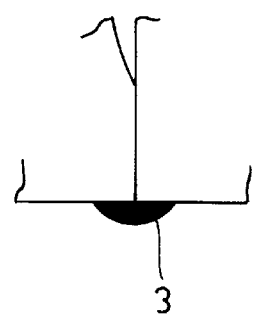

For cementing the homogeneous lens element to the radial type gradient index lens element at an assembly stage of the combination lens system according to the present invention, these lens elements may be assembled with a bonding agent applied to a planar surface portion 1 shown in FIG. 2A or an outer circumferential portion indicated by a reference numeral 3 illustrated in FIG. 2B which shows, on an enlarged scale, a portion 2B shown in FIG. 2A.

Aberrations are corrected favorably in the second embodiment though it is composed only of the two lens elements.

Figure 3:
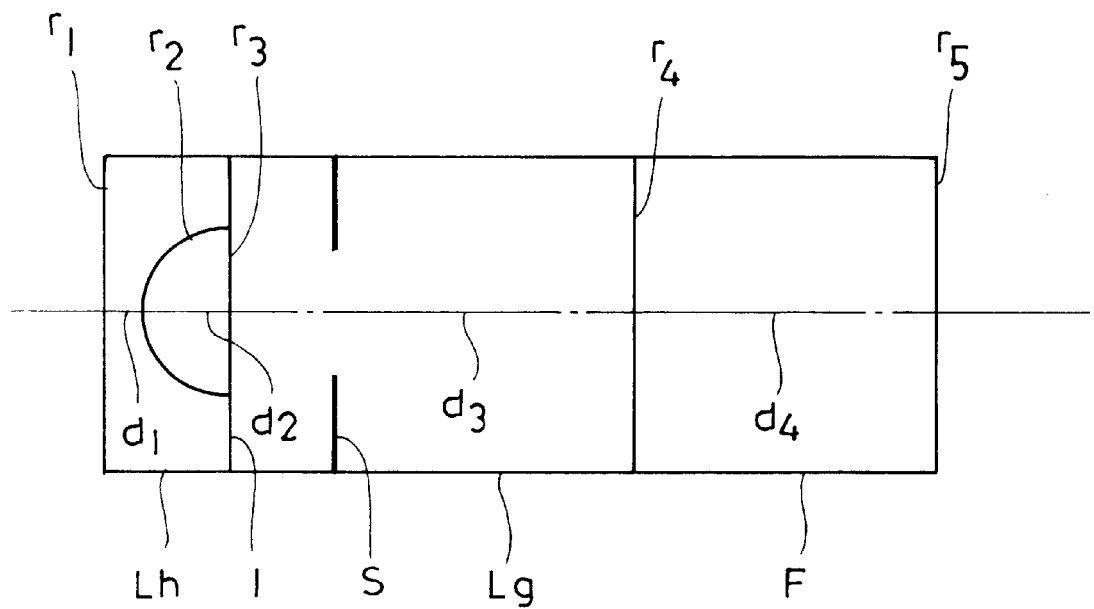
FIGS. 3 through 9 are sectional views illustrating composition of third through ninth embodiments respectively of the present invention.

The third embodiment of the present invention has a composition illustrated in FIG. 3. Speaking concretely, the third embodiment is a combination lens system composed, in order from the object side, of a first negative lens element and a second positive lens element which is a radial type gradient index lens element $L_g$ having planar surfaces on both sides. The first lens element is a plano-concave lens element which has a planar surface portion 1 outside an effective diameter on an image side surface thereof and cemented or kept to or in close contact with the radial type gradient index lens element $L_g$ on the planar surface portion. A stop S is disposed at a location which is 1 mm apart from an object side surface of the radial type gradient index lens element $L_g$ toward the image side. Further, a filter F for cutting out components having specific wavelengths is disposed on the image side of the radial type gradient index lens element.

The third embodiment is an example of combination lens system which has a field angle widened by strengthening a negative refractive power of a homogeneous lens element and is usable, for example, in an objective lens system for endoscopes. When the combination lens system according to the present invention is to be used in a lens system having a wide field angle, like the third embodiment, it is desirable to satisfy the following condition (11):

$$-2 < f_c/f_h < -0.6 \qquad (11)$$

If the upper limit of −0.6 of the condition (11) is exceeded, the combination lens system can hardly have a wide field angle. If the lower limit of −2 of the condition (11) is exceeded, in contrast, a Petzval's sum will be overcorrected and an image surface will undesirably be tilted away from an object.

Though it is rather hard to correct a Petzval's sum in the third embodiment wherein the combination lens system according to the present invention is to be used in a lens system having a wide field angle, a Petzval's sum is favorably corrected by configuring the radial type gradient index lens element so as to satisfy $N_{00d} > 1.6$.

A location of the stop which is selected in the radial type gradient index lens element makes it possible to reduce a diameter of the combination lens system and favorably correct offaxial aberrations in particular.

Aberrations are corrected favorably in the third embodiment though it is composed only of the two lens elements.

Figure 4:
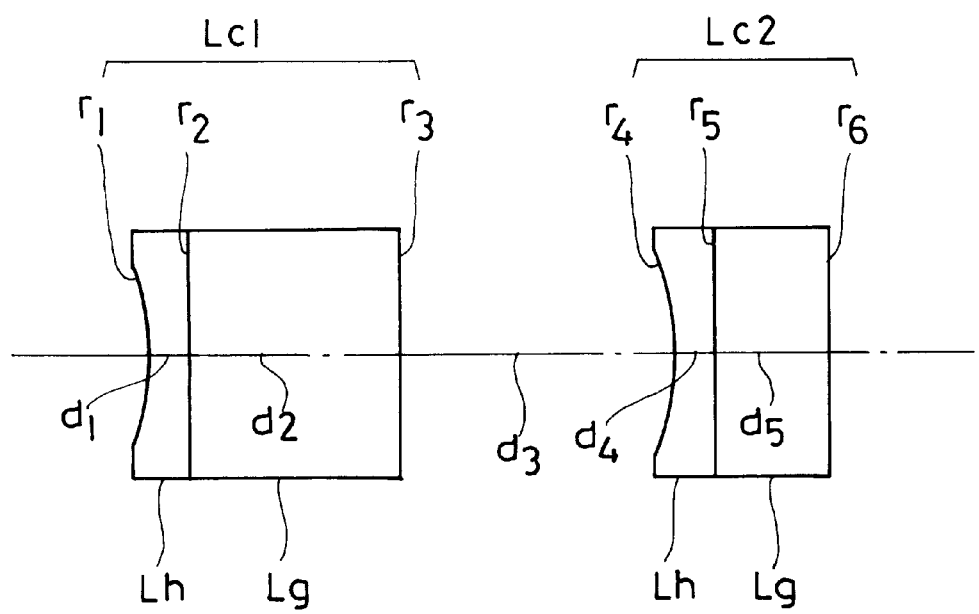

The fourth embodiment of the present invention has a composition illustrated in FIG. 4. Speaking concretely, the fourth embodiment consists of a combination lens system $L_{C1}$ which is composed, in order from the object side, of a first negative lens element and a second positive lens element, and a combination lens system $L_{C2}$ which is composed of a negative lens element and a positive lens element. Both the positive lens elements are radial type gradient index lens elements each having two planar surfaces, whereas the negative lens elements are concave planar homogeneous lens elements. The fourth embodiment is an example wherein the combination lens system according to the present invention is used in a pair for composing a high performance objective lens system for microscopes which has high optical performance and is composed of a small number of lens elements.

It is possible to obtain a lens system which is composed of a small number of lens elements and has high optical performance by using the combination lens system according to the present invention in an optical system which is to be used under a white light source as in the fourth embodiment.

Lens elements having equal r, d and n are used as the homogeneous lens elements so that the combination lens system can be manufactured at a cost reduced by commonly using some of the lens elements as described with reference to FIG. 18 in the second embodiment.

Aberrations are corrected favorably in the fourth embodiment.

Figure 5:
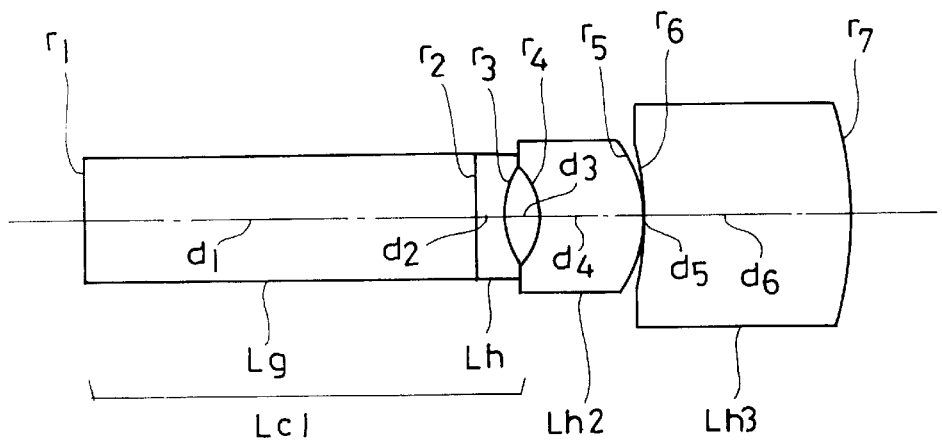

The fifth embodiment has a composition illustrated in FIG. 5. Speaking concretely, the fifth embodiment is an objective lens system for microscopes having a magnification of 20× which is composed, in order from the object side, of a combination lens system $L_{C1}$ consisting of a combination of a first radial type gradient index lens element $L_g$ having two planar surfaces and a second homogeneous lens element $L_h$ having a negative refractive power, a third homogeneous lens element $L_{h2}$ having a negative refractive power and a fourth homogeneous lens element $L_{h3}$ having a positive refractive power. The second lens element is a plano-concave lens element which has an object side cemented or kept to or in close contact with the radial type gradient index lens element. In the fifth embodiment, an objective lens system which is composed of lens elements in a number as small as four but has favorably corrected aberrations is obtained by using the combination lens system.

Further, a Petzval's sum is favorably corrected by using a homogeneous lens element which has a low refractive index and a negative refractive power in the combination lens system. When a Petzval's sum in particular poses a problem in an objective lens system or an optical system having a wide field angle as in the fifth embodiment, it is desirable that a homogeneous lens element to be used for composing the combination lens system has a refractive index not exceeding 1.16.

When the combination lens system is to be used in optical systems in which problems are posed by transmittance of lens elements and flare such as objective lens systems for non-flexible endoscopes and microscopes, it is desirable that a radial type gradient index lens element has a total length not exceeding approximately 40 mm. A lens system having more favorably imaging performance can be obtained when the radial type gradient index lens element has a total length not exceeding approximately 25 mm as in the fifth embodiment.

When the combination lens system according to the present invention is to be used in a lens system having a relatively narrow field angle like an objective lens system for microscopes, it is undesirable that the homogeneous lens element has a strong negative refractive power, or it is desirable to satisfy, in place of the condition (11), the following condition (12):

$$-0.6 < f_c/f_h < -0.1 \qquad (12)$$

If the lower limit of −0.6 of the condition (12) is exceeded, a Petzval's sum will be overcorrected and an image surface will be tilted away from an object. If the upper limit of −0.1 of the condition (12) is exceeded, in contrast, the Petzval's sum will be undercorrected and the image surface will undesirably be tilted toward the image side.

The fifth embodiment favorably corrects aberrations.

Figure 6:
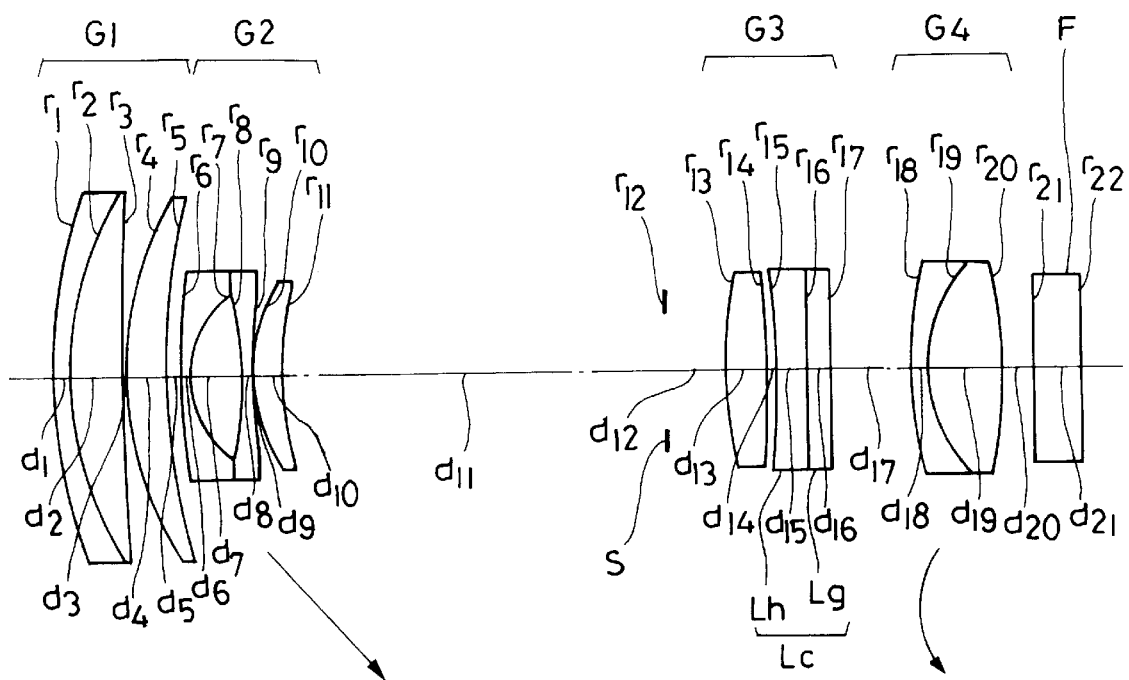

The sixth embodiment has a composition illustrated in FIG. 6. Speaking concretely, the sixth embodiment is a zoom lens system composed, in order from the object side, of a first lens unit $G_1$ which is kept stationary during a change of a magnification and has a positive refractive power, a second lens unit $G_2$ which moves in both directions along an optical axis for changing the magnification and has a negative refractive power, a third lens unit $G_3$ which is kept stationary during the change of the magnification and has a negative refractive power and a fourth lens unit $G_4$ which is movable for changing the magnification and has a function to correct a deviation of a focal point. The first lens unit $G_1$ is composed of a cemented lens component consisting of a negative lens element and a positive lens element, and a positive lens component; the second lens unit $G_2$ is composed of a negative lens component, a negative lens component and a positive lens component; the third lens unit $G_3$ is composed of a positive lens component and a combination lens system $L_C$ which consists of a negative lens element $L_h$ and a radial type positive gradient index lens element $L_g$; and the fourth lens unit $G_4$ is composed of a cemented lens component which consists of a negative lens element and a positive lens element. The combination lens system used in the third lens unit $G_3$ is composed of a concave-planar homogeneous lens element $L_h$ and the radial type gradient index lens element $L_g$ having two planar surfaces which are cemented or kept to or in close contact with each other. The combination lens system serves for favorably correcting longitudinal chromatic aberration in particular in the third lens unit $G_3$. Since a positive lens component is used in addition to the combination lens system for favorably correcting spherical aberration in the third lens unit $G_3$, longitudinal chromatic aberration in particular can hardly be corrected in the third lens unit $G_3$. Accordingly, the combination lens system is configured so as to have a negative value of $1/V_{10}$ for favorably correcting longitudinal chromatic aberration. Aberrations are corrected favorably in the sixth embodiment.

Figure 7:
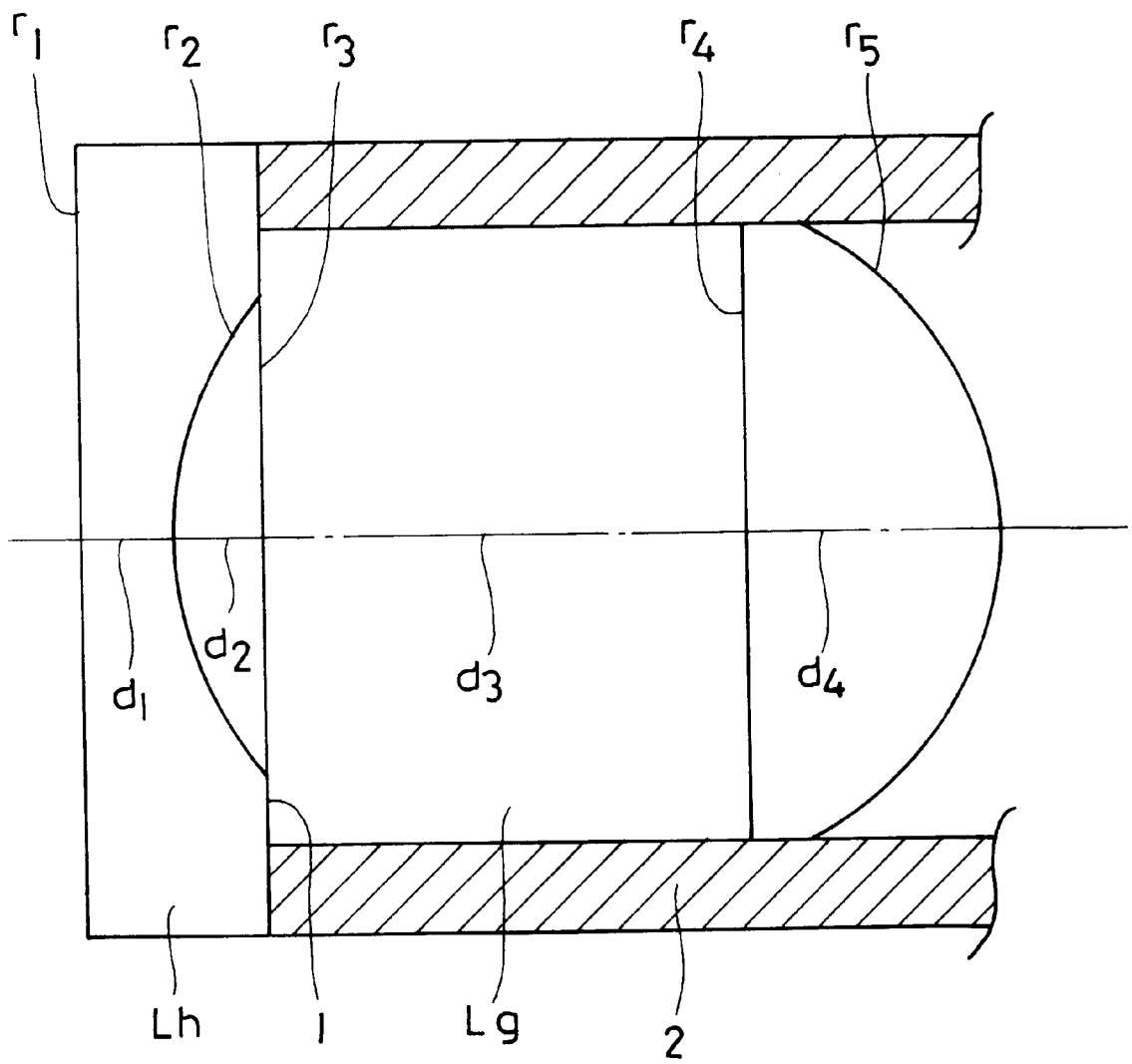

The seventh embodiment has a composition illustrated in FIG. 7. In other words, the seventh embodiment is a combination lens system which is composed, in order from the object side, of a first negative lens element, a second positive lens element and a third positive lens element. The second lens element is a radial type gradient index lens element $L_g$ having two planar surfaces. The first lens element is a plano-concave lens element having a planar surface portion 1 which is located outside an effective diameter of an image side surface and cemented or kept to or in close contact with the radial type gradient index lens element $L_g$. The third lens element is a plano-convex lens element which has an object side surface cemented or kept to or in close contact with the radial type gradient index lens element. The seventh embodiment is an example of a wide-angle lens system which is obtained by using a positive homogeneous lens element in addition to a combination of a first lens element and a second lens element, and utilizable as an optical system for objective lens systems for endoscopes, monitor cameras and board cameras.

Further, the radial type gradient index lens element has a diameter which is different from that of the homogeneous lens elements so that a lens barrel or a portion thereof can be disposed efficiently, thereby configuring a lens system compacter.

When the combination lens system according to the present invention is to be held in a lens barrel, the homogeneous lens element and the radial type gradient index lens element are not necessarily be cemented to one another.

The seventh embodiment corrects aberrations favorably though it is composed only of the three lens elements.

Now, manufacturing procedures for the combination lens system according to the present invention will be described in details in comparison with those for the conventional examples.

FIGS. 19A, 19B and 19C show a conventional example wherein a spherical surface is to be formed directly on a radial type gradient index lens element $L_g$. A radial type gradient index lens element having a cylindrical form before working a spherical surface and its refractive index distribution are shown in FIG. 19A, wherein the reference symbol $L_g$ represents the radial type gradient index lens element, the reference symbol n(r) designates a refractive index at a point located at a radial distance r and an optical axis 5 of a medium is aligned with a center axis of a circumferential portion 6. FIG. 19B shows an ideal example wherein one side surface $r_1$ is formed as a spherical surface so that its optical axis is aligned with the optical axis of the medium. At an actual working stage, however, it is not easy to form the surface $R_1$ with high precision as shown in FIG. 19B and an optical axis 7 of the surface $R_1$ may be eccentric from the optical axis 5 of the medium for a distance δ in a direction perpendicular to the optical axis of the medium and at an inclination angle ε as shown in FIG. 19C. Though such an eccentricity does not pose a problem in case of a homogeneous lens element since the spherical surface can be centered by cutting off a circumferential portion taking an optical axis of a polished surface as standard, such centering cannot be performed in case of a radial type gradient index lens element since it makes the optical axis of the medium eccentric relative to the outer circumferential portion.

Figure 20A:
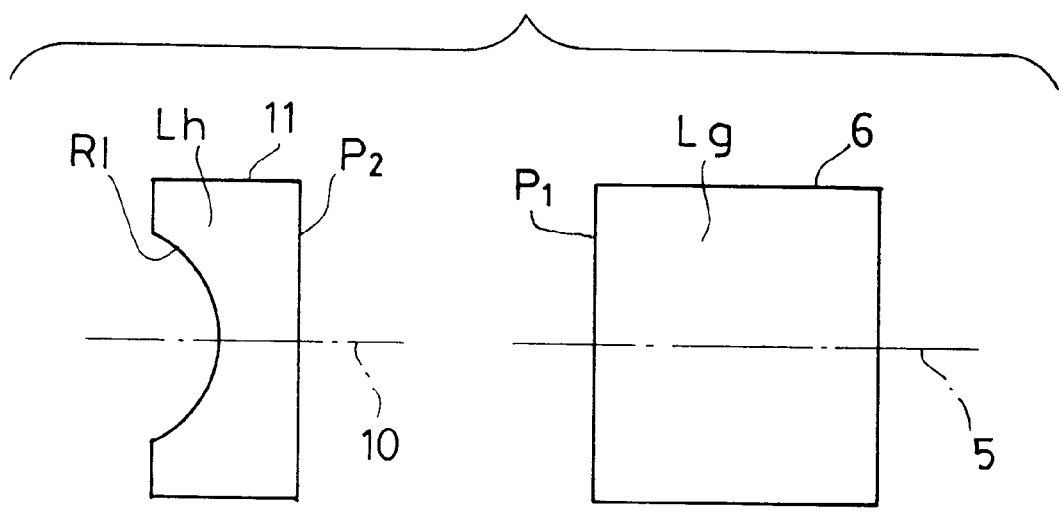
FIGS. 20A and 20B are diagrams exemplifying manufacturing processes of the combination lens system according to the present invention.
Figure 20B:
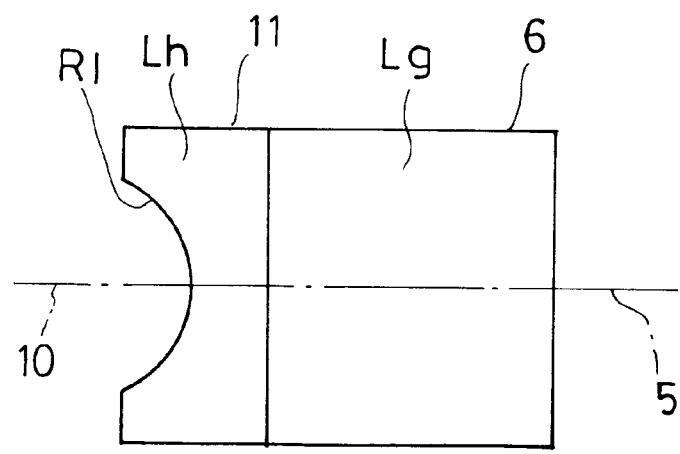

For this reason, a radial type gradient index lens element $L_g$ having two planar surfaces and a homogeneous spherical lens element $L_h$ having a planar surface portion P are cemented or brought to or into close contact with each other in the combination lens system according to the present invention as in a model shown in FIG. 20A and 20B. Shown in FIG. 20A are a radial type gradient index lens element $L_g$ having two surfaces machined into planar surfaces and a homogeneous lens element $L_h$ having a planar surface portion on one surface. Since an optical axis 5 of medium of the radial type gradient index lens element $L_g$ is aligned with a center axis of an outer circumferential portion 6 and the homogeneous lens element $L_h$ can be centered, the optical axis 10 of a surface $R_1$ can easily be aligned with the center axis of the outer circumferential portion 11 with high precision. In FIG. 20B, the radial type gradient index lens element $L_g$ and the homogeneous lens element $L_h$ are cemented or brought to or into contact with each other on planar surfaces portions $P_1$ and $P_2$ of the lens elements. When the outer circumferential portion 6 of the radial type gradient index lens element $L_g$ and the outer circumferential portion 11 of the homogeneous lens element $L_h$ are aligned with each other, for example, it is easy to align the optical axis 5 of medium of the radial type gradient index lens element with the optical axis 10 of the homogeneous lens element with each other.

In contrast to the manufacturing procedures shown in FIGS. 19A, 19B and 19C which lower a yield and require a high manufacturing cost since the radial type gradient index lens element $L_g$ cannot be used when eccentricity is produced at a working stage of a spherical surface, the manufacturing method for the combination lens system according to the present invention illustrated in FIGS. 20A and 20B assure a high yield and permits manufacturing the combination lens system at an extremely low cost since excentricity poses no problem at all at a working stage of a spherical surface. Further, the radial type gradient index lens element can be worked with high precision and at a low cost.

Now, description will be made of the image pickup lens system according to the present invention.

The image pickup lens system according to the present invention is characterized in that it is composed of a homogeneous lens element having a negative refractive power, and a radial type gradient index lens element having a positive refractive power and a refractive index distribution in a radial direction expressed by the formula (a) shown below, and that it satisfies the following condition (21):

$$N(r)=N_{00}+N_{10}r^2+N_{20}r^4 \ldots \quad -0.5<1/V_{10}<0.015 \qquad 21(a)$$

The image pickup lens system according to the present invention is composed of the two lens elements, or the homogeneous lens element and the radial type gradient index lens element. By configuring the lens system so as to be composed of the two lens elements, it is possible not only to lower costs for polishing and assembly but also to simplify a structure of a lens barrel, thereby enabling to manufacture the image pickup lens system at an extremely low cost. Further, it is possible to obtain an image pickup lens system having high imaging performance by using a radial type gradient index lens element which has larger freedom for correction of aberrations than a homogeneous lens element.

Since it is important to correct chromatic aberration in particular for obtaining an image pickup lens system having high imaging performance, the inventor conceived to effectively utilize a radial type gradient index lens element which has an excellent characteristic for correcting chromatic aberration.

Longitudinal chromatic aberration to be produced by a radial type gradient index lens element is approximated by the above-mentioned formula (d).

As clear from the formula (d), an amount of longitudinal chromatic aberration to be produced can be controlled by selecting an adequate value for $V_{10}$ of a radial type gradient index lens element.

For favorably correcting longitudinal chromatic aberration, the image pickup lens system according to the present invention is configured so as to satisfy the above-mentioned condition (21).

When the condition (21) is satisfied, it is possible to favorably correct chromatic aberration produced by a radial type gradient index lens element. If the lower limit of −0.5 of the condition (21) is exceeded, longitudinal chromatic aberration will be overcorrected. If the upper limit of 0.015 of the condition (21) is exceeded, in contrast, longitudinal chromatic aberration will undesirably be undercorrected.

A Petzval's sum of the image pickup lens system as a whole can be favorably corrected by imparting a negative refractive power to the homogeneous lens element. If the homogeneous lens element has a positive refractive power, the image pickup lens system as a whole will have an under-corrected Petzval's sum and an image surface will undesirably be tilted toward the object side.

The image pickup lens system according to the present invention which has a second composition is characterized in that it is composed of a homogeneous lens element having a negative refractive power, and a radial type gradient index lens element which has a positive refractive power and a refractive index distribution in a radial direction expressed by the above-mentioned formula (a), that the radial type gradient index lens element has two planar surfaces, and that the lens system is configured so as to satisfy the following condition (1):

$$1/V_{10} < 1/\nu_h \qquad (1)$$

wherein the reference symbol $\nu_h$ represents an Abbe's number of the homogeneous lens element.

The image pickup lens system according to the present invention which has the second composition is composed of the two lens elements and can be manufactured at a low cost. For manufacturing the image pickup lens system at a lower cost, it is desirable to configure the radial type gradient index lens element so as to have planar surfaces on both sides. Planar surfaces can be worked at a far lower cost than spherical surfaces. By configuring the radial type gradient index lens element so as to have two planar surfaces, it is possible to prevent optical axes of surface and medium of the radial type gradient index lens element from being eccentric from each other at a practical working stage, thereby facilitating assembly and adjustment.

However, freedom for correcting aberrations is narrowed and a Petzval's sum in particular may be under-corrected when the radial type gradient index lens element has two planar surfaces.

By selecting an adequate refractive index distribution between the homogeneous lens element and the radial type gradient index lens element used in the image pickup lens system according to the present invention, it is possible to favorably correct a Petzval's sum and obtain an image pickup lens system which is excellent in workability, can be manufactured at a low cost and has high imaging performance.

For obtaining high optical performance of an image pickup lens system which is composed of a homogeneous lens element and a radial type gradient index lens element, it is obliged first to consider correction of a Petzval's sum and chromatic aberration out of aberration since amounts of these aberrations to be produced are determined almost dependently on a refractive power arrangement in the lens system and, once determined, can hardly be corrected by bending the lens elements.

A Petzval's sum PTZ to be produced by a radial type gradient index lens element is approximated by the above-mentioned formula (g) as described above.

Further, a refractive power of medium $\phi_m$ of a radial type gradient index lens element is approximated by the above-mentioned formula (e).

In case of the image pickup lens system according to the present invention which uses the radial type gradient index lens element having the two planar surfaces and $\phi_s$ of nearly 0, the formulae (d) and (g) have values of the second terms only. Further, since the homogeneous lens is kept in close contact with the radial type gradient index lens element, longitudinal chromatic aberration and a Petzval's sum to be produced by the image pickup lens system according to the present invention are expressed by the above-mentioned formulae(f) and (h) respectively.

From these formulae (f) and (h), it will be understood that longitudinal chromatic aberration and a Petzval's sum having desired values can be obtained by varying a refractive power of the homogeneous lens element, refractive power of the radial type gradient index lens element and the parameters such, as $V_{10}$ used in the formulae.

For configuring the image pickup lens system so as to produce longitudinal chromatic aberration in an amount smaller than that of longitudinal chromatic aberration to be produced by a homogeneous lens element having an Abbe's number $\nu_h$ and a refractive power $\phi$ which is the same as that of the image pickup lens system so that longitudinal chromatic aberration can be favorably corrected, it is necessary to satisfy the following formula:

$$K(\phi_h/\nu_h + \phi_m/V_{10}) < K(\phi/\nu_h)$$

wherein $$\phi = \phi_m + \phi_h$$

By developing this formula, we obtain $\phi_m/V_{10} < \phi_{m/\nu h}$, from which the above-mentioned condition (1) is derived.

That is to say, longitudinal chromatic aberration can be favorably corrected in the image pickup lens system according to the present invention which has the second composition when the Abbe's number $\nu_h$ of the homogeneous lens element and the Abbe's number $V_{10}$ of the radial type gradient index lens element satisfy the relationship defined by the condition (1). The condition (1) defines a requirement for favorably correcting longitudinal chromatic aberration in the image pickup lens system according to the present invention. If the condition (1) is not satisfied, longitudinal chromatic aberration will undesirably be under-corrected.

As judged from the formula (f), it is necessary for favorable correction of longitudinal chromatic aberration not only to satisfy the condition (1) but also to select an adequate refractive power arrangement between the homogeneous lens element and the radial type gradient index lens element. For determining a refractive power arrangement, however, it is necessary to take into sufficient consideration not only correction of chromatic aberration but also correction of a Petzval's sum since an amount of a Petzval's sum to be produced, like that of chromatic aberration, is determined almost dependently on a refractive power arrangement in the lens system as already described above and clear from the formula (h).

From the formulae (f) and (h), a refractive power arrangement for simultaneous correction of longitudinal chromatic aberration and a Petzval's sum in the image pickup lens system is determined as described below. The formulae (f') and (h') can be obtained by using a ratio between refractive powers of medium given by the above-mentioned formula (i) in the formulae (f) and (h) respectively.

From FIG. 17 which visualizes the formulae (f') and (h') in a form of a graph, it will be understood that a first requisite for simultaneous correction of longitudinal chromatic aberration and a Petzval's sum is that $a_{PAC}$ and $a_{PTZ}$ have values which are close to each other. When $a_{PAC}$ and $a_{PTZ}$ have values of signs different from each other, for example, it is impossible to correct longitudinal chromatic aberration and a Petzval's sum at the same time in the image pickup lens system. When the ratio a between refractive powers of medium has a value close to the values of $a_{PAC}$ and $a_{PTZ}$ which are close to each other, it is possible to obtain an image pickup lens system in which longitudinal chromatic aberration and a Petzval's sum are favorably corrected.

Since the refractive index $N_{00}$ on the optical axis is not different largely from that of a currently available glass material under the present circumstance of the manufacturing technology for materials having refractive index distributions, $N_{00}$ has a value on the order of 1.5 to 1.9. Further, since the refractive index $n_h$ of the homogeneous glass material has a value also on the order of 1.5 to 1.9, the formula (k) satisfies the condition (k') as described above.

When the image pickup lens system according to the present invention satisfies the condition (1), the formula (j) satisfies the condition (j').

On the basis of this fact, $a_{PAC}$ and $a_{PTZ}$ have values larger than 0 when longitudinal chromatic aberration and a Petzval's sum are favorably corrected. Accordingly, it is necessary that the ratio between refractive powers of medium must also have a value larger than 0.

Further, from the formula (k'), it is more desirable that the ratio a between refractive powers of medium has a value larger than 1.

That is to say, arrangement between a refractive power of medium of the radial type gradient index lens element and a refractive power of the homogeneous lens element is in the relationship defined by the formula (i').

When refractive powers of the radial type gradient index lens element and the homogeneous lens element used for the image pickup lens system satisfy the formula (i'), longitudinal chromatic aberration and a Petzval's sum can be corrected favorably. If the condition (i') is not satisfied, it will be difficult to correct longitudinal chromatic aberration and a Petzval's sum at the same time.

Since the image pickup lens system according to the present invention has a positive refractive power, it is necessary for satisfying the condition (i') that $\phi_m$ has a value larger than 0 and $\phi_h$ has a value smaller than 0. In other words, it is necessary that the radial type gradient index lens element has a positive refractive power of medium and the homogeneous lens element has a negative refractive power. If the homogeneous lens element has a positive refractive power, it will be difficult to favorably correct a Petzval's sum and longitudinal chromatic aberration.

For aligning an optical axis of the homogeneous lens element with high precision with that of the radial type gradient index lens element in the image pickup lens system according to the present invention, it is desirable that at least one surface of the homogeneous lens element is configured so as to be partially or entirely planar and the homogeneous lens element is cemented or brought to or into close contact with the radial type gradient index lens element on the planar surface portion. When the homogeneous lens element and the radial type gradient index lens element have an equal outside diameter and are cemented or brought to or into close contact with each other taking the outside diameter as standard, for example, optical axes of these lens elements can be aligned easily. Alternately, the optical axes can be aligned by measuring either or both of the optical axes of the homogeneous lens element and the radial type gradient index lens element, adjusting positions the lens elements until the optical axes are aligned with each other and cementing or bringing the lens elements to or into close contact with each other. When both the lens elements have planar surface portions and are kept in contact with each other, the adjustment can be carried out extremely easily. Cementing or bringing the lens elements to or into close contact provides a merit to permit simplifying a structure of a lens barrel. A similar effect can be obtained by interposing an airspace adjusting ring (a spacer) between the homogeneous lens element and the radial type gradient index lens element.

The image pickup lens system according to the present invention which has a third composition is characterized in that it is composed, in order from the object side, of a homogeneous lens element having a negative refractive power, and a radial type gradient index lens element which has a positive refractive power and a refractive index distribution in a radial direction expressed by the above-mentioned formula (a), and that it is focused on an object located at an extremely short distance by varying an airspace reserved between the homogeneous lens element and the radial type gradient index lens element.

When the image pickup lens system according to the present invention is to be used in a video camera or the similar instrument which requires relatively high optical performance, it is necessary to take focusing into sufficient consideration. In other words, aberrations must be favorably corrected within an entire range from infinite to extremely short object distances. When compactness of the lens system is taken into consideration, it is desirable to minimize a burden to be imposed on a driving mechanism for focusing.

For the reasons described above, the image pickup lens system is configured to be focused by varying the airspace reserved between the homogeneous lens element and the radial type gradient index lens element. In other words, when only either of the lens elements is moved for focusing the lens system, the movable lens element is light in weight, a burden on a driving mechanism is extremely light, and a lens barrel and a driving mechanism can be configured compact, thereby making it possible to obtain a compact image pickup lens system. Though it is possible to configure the lens system so as to be movable as a whole for focusing or adopt the so-called displacement of the lens system as a whole, movable lens elements are heavy in weight and a burden on a driving mechanism is heavy in this case, thereby undesirably making it impossible to obtain an image pickup lens system which has a compact composition.

For reducing variations of aberrations to be caused by focusing, it is desirable to configure only the homogeneous lens element having the negative refractive power so as to be movable for focusing. Further, it is desirable to compose the image pickup lens system of a first negative homogeneous lens component and a second radial type positive gradient index lens component, and move the first negative lens component toward the object side for focusing the lens system on an object located at an extremely short distance. When the first lens component is moved toward the object side for focusing the lens system on the object located at the extremely short distance, variations of heights of paraxial incident rays are extremely small, thereby enabling to reduce variations of spherical aberration to be caused by focusing in particular. Further, favorable imaging performance can be obtained since amounts of longitudinal chromatic aberration and a Petzval's sum are not varied so remarkably.

For aligning the optical axis of the homogeneous lens element with that of the radial type gradient index lens element with high precision as described above, it is desirable to configure at least one surface of the homogeneous lens element partially or entirely planar and cement or bring the planar surface portion to or into close contact with the radial type gradient index lens element directly or with a spacing ring interposed. When the image pickup lens system is to be focused by varying an airspace reserved between the homogeneous lens element and the radial type gradient index lens element, however, it is desirable to bring these lens elements into close contact with each other once at an assembly stage and adjust positions of the lens elements so as to align the optical axes at this stage.

The image pickup lens system according to the present invention is usable in image pickup systems which use solid-state image pickup devices such as CCD's and image guides composed of optical fiber bundles. When the image pickup lens system is to be used in such image pickup systems, it is desirable for reserving a sufficient amount of marginal rays to compose the lens system, in order from the object side, of a first lens component having a negative refractive power and a second lens component having a positive refractive power. Angles of incidence of the offaxial rays on an image surface can be brought close to a right angle by selecting a negative-positive refractive power arrangement for the lens system. That is to say, the offaxial rays are brought in a direction where they become parallel with the optical axis and marginal rays are reserved in a sufficient amount by selecting the negative-positive refractive power arrangement for the image pickup lens system. If the image pickup lens system is composed, in order from the object side, of a positive lens component and a negative lens component, it will be difficult to bring angles of incidence of the offaxial rays on the image surface in the direction where they become parallel with the optical axis, thereby undesirably making it difficult to reserve marginal rays in a sufficient amount.

For favorably correcting longitudinal chromatic aberration and a Petzval's sum in the image pickup lens system according to the present invention, it is desirable that the homogeneous lens element has a negative refractive power which is strong to a certain degree. A requisite for favorable correction of longitudinal chromatic aberration and a Petzval's sum is that the radial type gradient index lens element has a positive refractive power of medium and the homogeneous lens element has a negative refractive power. If the homogeneous lens element has an extremely weak refractive power, it will be difficult to correct a Petzval's sum in particular.

For the reason described above, it is desirable that the image pickup lens system according to the present invention satisfies the following condition (23):

$$-1.5 < f/f_h < -0.05 \tag{23}$$

wherein the reference symbol f represents a focal length of the image pickup lens system as a whole and the reference symbol $f_h$ designates a focal length of the homogeneous lens component.

When the image pickup lens system according to the present invention satisfies the condition (23), it is capable of favorably correcting a Petzval's sum. If the upper limit of −0.05 of the condition (23) is exceeded, a Petzval's sum will be undercorrected and an image surface will undesirably be tilted toward the object side. If the lower limit of −1.5 of the condition (23) is exceeded, in contrast, the Petzval's sum will be overcorrected and the image surface will undesirably be tilted in a direction away from the object side.

Offaxial aberrations, distortion in particular, are apt to be aggravated by moving a first lens component toward the object side when the image pickup lens system is composed, in order from the object side, of a first negative lens component and a second positive lens component, and the first lens component is moved for focusing. However, distortion can be favorably corrected by selecting an adequate negative refractive power for the first lens component. When the first lens component is to be moved for focusing, it is therefore desirable that the image pickup lens system satisfies the above-mentioned condition (23).

When the first lens component has a focal length satisfying the condition (23), it is possible to reduce variations of offaxial aberrations to be caused by focusing. If the lower limit of −1.5 of the condition (23) is exceeded, the first lens component will have too strong a negative refractive power, thereby aggravating the offaxial aberrations. If the upper limit of −0.05 of the condition (23) is exceeded, in contrast, the first lens component will have a weak negative refractive power and must be moved for a long distance for focusing, thereby making it difficult to configure the image pickup lens system compact.

The image pickup lens system according to the present invention as a whole has a positive refractive power and tends to produce negative spherical aberration. Spherical aberration can be favorably corrected by composing the image pickup lens system of a homogeneous lens component having a negative refractive power and a radial type gradient index lens component having two planar surfaces. When a radial type gradient index lens component has a planar surface and a concave surface in place of the two planar surfaces, for example, the concave surface has a function to reduce an amount of positive spherical aberration since it has a refractive index which is lowered as portions of the concave surface are farther from the optical axis toward a marginal portion. Accordingly, an image pickup lens system which uses such a radial type gradient index lens element undercorrects negative spherical aberration.

However, the image pickup lens system according to the present invention uses the radial type gradient index lens element having the two planar surfaces which do not produce spherical aberration and the homogeneous lens element having the negative refractive power which produces positive spherical aberration. It is therefore possible to correct spherical aberration favorably in the image pickup lens system as a whole.

As understood from the foregoing description, the image pickup lens system according to the present invention has excellent productivity and is capable of favorably correcting not only longitudinal chromatic aberration and a Petzval's sum but also spherical aberration.

When the image pickup lens system according to the present invention is to be used in a video camera or the similar instrument, it is desired that the lens system has a field angle which is large to a certain degree. The image pickup lens system according to the present invention can have a wide field angle owing to the fact that the negative lens component is disposed on the object side of the radial type gradient index lens element. In addition, it is desirable to strengthen, to a certain degree, a refractive power of the radial type gradient index lens component. When the radial type gradient index lens component has a refractive power which is strong to a certain degree, the image pickup lens system as a whole can have a short focal length and a wide field angle.

Now, let us consider to strengthen a refractive power of medium of the radial type gradient index lens component. From the formula (e) mentioned above, it is necessary for strengthening a refractive power of medium to enlarge $N_{10}$ or $t_G$. However, enlargement of $N_{10}$ is undesirable since it is difficult to manufacture a material having a large value of $N_{10}$ under the present circumstance of manufacturing technology for materials having refractive index distributions. Accordingly, the inventor conceived to configure a radial type gradient index lens element so as to have adequate thickness so that a sufficient refractive power can be obtained without extremely enlarging $N_{10}$. In other words, it is desirable for the image pickup lens system according to the present invention that the radial type gradient index lens component satisfies the following condition (24):

$$0.5 < t_G/f < 9 \quad (24)$$

wherein the reference symbol f represents a focal length of the image pickup lens system as a whole.

When the condition (24) is satisfied, it is possible to effectively utilize the effect for correcting longitudinal chromatic aberration and a Petzval's sum. If the lower limit of 0.5 of the condition (24) is exceeded, the radial type gradient index lens component will have a weak refractive power, thereby making it difficult to effectively utilize the effect for correcting longitudinal chromatic aberration and a Petzval's sum. If the upper limit of 9 of the condition (24) is exceeded, in contrast, the radial type gradient index lens component will be thick and an image may be formed undesirably within the lens component.

When the image pickup lens system according to the present invention is to be used in an image pickup system which uses a solid-stage image pickup device having picture elements arranged at a narrow pitch and requires higher imaging performance, it is desirable to satisfy, in place of the condition (24), the following condition (25):

$$1.5 < t_G/f < 7 \quad (25)$$

If the lower limit of 1.5 of the condition (25) is exceeded, the image pickup lens system will have a weak refractive power, thereby making it difficult to effectively utilize the effect for correcting longitudinal chromatic aberration and a Petzval's sum in the lens system which requires high imaging performance. If the upper limit of 7 of the condition (25) is exceeded, in contrast, the radial type gradient index lens component will be thick, lower transmittance and aggravate flare, thereby making it difficult to obtain high imaging performance.

When the image pickup lens system according to the present invention is to be used in a lens system which requires higher imaging performance, it is desirable to satisfy, in place of the condition (21), the following condition (26):

$$-0.01 < 1/V_{10} < 0.008 \quad (26)$$

When the radial type gradient index lens component satisfies the condition (26), it is possible to correct longitudinal chromatic aberration more favorably. If the upper limit of 0.008 of the condition (26) is exceeded, longitudinal chromatic aberration will undesirably be under-corrected. If the lower limit of −0.01 of the condition (26) is exceeded, in contrast, longitudinal chromatic aberration will undesirably be overcorrected.

Further, it is possible to control an amount of spherical aberration by varying a value of the refractive index distribution coefficient of the fourth order $N_{20}$ for the radial type gradient index lens component. For correcting spherical aberration favorably in the image pickup lens system according to the present invention, it is desirable to satisfy the following condition (27):

$$-0.2 < N_{20} \times f^4 < 0.2 \quad (27)$$

When the radial type gradient index lens component satisfies the condition (27), spherical aberration can be corrected favorably. If the upper limit of 0.2 of the condition (27) is exceeded, spherical aberration will undesirably be overcorrected. If the lower limit of −0.2 of the condition (27) is exceeded, in contrast, spherical aberration will undesirably be undercorrected.

When the image pickup lens system according to the present invention is to be used in a lens system which requires higher imaging performance, it is desirable to satisfy in place of the condition (27), the following condition (28):

$$-0.05 < N_{20} \times f^4 < 0.05 \quad (28)$$

When the radial type gradient index lens component satisfies the condition (28), spherical aberration can be corrected more favorably. If the upper limit of 0.05 of the condition (28) is exceeded, spherical aberration will be overcorrected, thereby undesirably making it impossible to obtain high imaging performance. If the lower limit of −0.05 of the condition (28) is exceeded, in contrast, spherical aberration will be undercorrected, thereby undesirably making it impossible to obtain high imaging performance.

For favorably correcting lateral chromatic aberration in addition to longitudinal chromatic aberration in the image pickup lens system according to the present invention, it is desirable to satisfy the following condition (29):

$$1/v_h < 0.03 \quad (29)$$

Since a height of an offaxial principal ray on the homogeneous lens component is different from that on the radial type gradient index lens component in the image pickup lens system according to the present invention, it is desirable for correction of chromatic aberration in addition to longitudinal chromatic aberration that either of the lens components produces chromatic aberration in a small amount. An amount of chromatic aberration to be produced by the radial type gradient index lens component can be reduced by configuring it so as to satisfy the condition (22). It is desirable to configure the homogeneous lens component so as to satisfy the condition (29). When the condition (29) is satisfied, it is possible to reduce lateral chromatic aberration in addition to longitudinal chromatic aberration. If the condition (29) is not satisfied, it will be difficult to correct lateral chromatic aberration favorably.

When the image pickup lens system is to be used in a lens system which requires higher imaging performance, it is desirable to satisfy, in place of the condition (29), the following condition (9):

$$1/v_h < 0.025 \quad (9)$$

When the condition (9) is satisfied, it is possible to correct lateral chromatic aberration more favorably. If the condition (9) is not satisfied, lateral chromatic aberration will be undercorrected, thereby undesirably making it impossible to obtain high imaging performance.

For correcting a Petzval's sum more favorably in the image pickup lens system according to the present invention, it is desirable to satisfy the following condition (10):

$$N_{00d} > 1.55 \quad (10)$$

When the condition (10) is satisfied, the second term of the formula (h) has a smaller value, thereby making it possible to sufficiently reduce a Petzval's sum to be produced by a medium of the radial type gradient index lens component. If the condition (10) is not satisfied, a Petzval's sum to be produced by the medium of the radial type gradient index lens element will undesirably be undercorrected.

When the image pickup lens system according to the present invention is to be used in a lens system which has a relatively wide field angle, the lens system as a whole must have a strong refractive power φ. For correcting longitudinal chromatic aberration favorably in the image pickup lens system which has such a strong refractive power, it is desirable to satisfy the following condition (32):

$$0.5 < a_{PAC} < 1.7 \tag{32}$$

As the refractive power $\phi$ $(=\phi_m+\phi_h)$ of the image pickup lens system as a whole is strengthened, a value of ratio between refractive powers of medium given by the formula (i) becomes closer to 1. Further, it is desirable for favorable correction of longitudinal chromatic aberration that value of $a_{PAC}$ and that of the ratio a between refractive powers of medium are close to each other. For this reason, it is desirable that the image pickup lens system according to the present invention satisfies the above-mentioned condition (32). In other words, it is possible to favorably correct longitudinal chromatic aberration when the condition (32) is satisfied. If the upper limit of 1.7 of the condition (32) is exceeded longitudinal chromatic aberration will be undercorrected If the lower limit of 0.5 of the condition (32) is exceeded, in contrast, longitudinal chromatic aberration will undesirably be overcorrected.

Optical performance of the image pickup lens system according to the present invention can be improved by replacing the homogeneous lens component or the radial type gradient index lens component with an optical element which has a function of a low pass filter for cutting out components having specific wavelengths, an infrared cut filter or a band cut filter.

Further, aberrations can be corrected more favorably by using an aspherical surface on the homogeneous lens component.

When a burden imposed on a driving mechanism for focusing does not pose a serious problem, it is possible to move the homogeneous lens component and the radial type gradient index lens component integrally or the image pickup lens system as a whole toward the object side.

Now, numerical data of eighth through fifteenth embodiments of the image pickup lens system according to the present invention will be described:

---

Embodiment 8

$f = 4.2$ mm, F number 2.0, $2\omega = 42°$ $r_1 = -10.4898$
  $d_1 = 1.0000$    $n_1 = 1.48749$    $v_1 = 70.21$
$r_2 = \infty$ (stop)
  $d_2 = 0$
$r_3 = \infty$
  $d_3 = 8.000$    $n_2$ (gradient index lens element)
$r_4 = \infty$
  $d_4 = 1.0000$    $n_3 = 1.51633$    $v_3 = 64.15$
$r_5 = \infty$ gradient index lens element

|         | $N_{00}$ | $N_{10}$              | $N_{20}$                |
|---------|----------|-----------------------|-------------------------|
| d line  | 1.75000, | $-0.19934 \times 10^{-1}$, | $-0.28601 \times 10^{-4}$ |
| C line  | 1.74500, | $-0.19904 \times 10^{-1}$, | $-0.28557 \times 10^{-4}$ |
| F line  | 1.76167, | $-0.20005 \times 10^{-1}$, | $-0.28703 \times 10^{-4}$ |

$1/V_{10} = 0.0051$, $1/v_h = 0.0142$, $f/f_h = -0.1952$,
$t_G/f = 1.9048$, $N_{20} \times f^4 = -0.0089$, $N_{00d} = 1.7500$,
$a_{PAC} = 1.5572$

---

Embodiment 9

$f = 4.88$ mm, F number 3.5, $2\omega = 28.6°$ $r_1 = 10.1312$
  $d_1 = 1.8000$    $n_1 = 1.84666$    $v_1 = 23.78$
$r_2 = 4.3922$ (aspherical surface)
  $d_2 = 0.5000$
$r_3 = \infty$
  $d_3 = 8.0000$    $n_2$ (gradient index lens element)
$r_4 = \infty$
  $d_4 = 1.0000$    $n_3 = 1.51633$    $v_3 = 64.15$
$r_5 = \infty$ aspherical surface coefficients $P = 1$,    $A_4 = -0.63278 \times 10^{-2}$,    $A_6 = 0.38524 \times 10^{-2}$,
    $A_8 = -0.12709 \times 10^{-2}$ gradient index lens element

|         | $N_{00}$ | $N_{10}$              | $N_{20}$                |
|---------|----------|-----------------------|-------------------------|
| d line  | 1.75000, | $-0.19934 \times 10^{-1}$, | $-0.28601 \times 10^{-4}$ |
| C line  | 1.74500, | $-0.19904 \times 10^{-1}$, | $-0.28557 \times 10^{-4}$ |
| F line  | 1.76167, | $-0.20005 \times 10^{-1}$, | $-0.28703 \times 10^{-4}$ |

$1/V_{10} = 0.0051$, $1/v_h = 0.0421$, $f/f_h = -0.4559$,
$t_G/f = 1.6407$, $N_{20} \times f^4 = -0.0162$, $N_{00d} = 1.7500$,
$a_{PAC} = 1.1379$

---

Embodiment 10 focal distance = 0.844 mm, object distance = 11 mm,
NA = 0.073, $2\omega = 129.2°$ $r_1 = \infty$
  $d_1 = 0.3600$    $n_1 = 1.88300$    $v_1 = 40.78$
$r_2 = 0.6800$
  $d_2 = 0.8000$
$r_3 = \infty$
  $d_3 = 3.8000$    $n_2$ (gradient index lens element)
$r_4 = \infty$
  $d_4 = 2.8000$    $n_3 = 1.51633$    $v_3 = 64.15$
$r_5 = \infty$ gradient index lens element

|         | $N_{00}$ | $N_{10}$         | $N_{20}$               | $N_{30}$                |
|---------|----------|------------------|------------------------|-------------------------|
| d line  | 1.70000, | $-0.12580 \times 10$, | $0.78000 \times 10^{-2}$, | $-0.47000 \times 10^{-3}$ |
| C line  | 1.69475, | $-0.12567 \times 10$, | $0.77922 \times 10^{-2}$, | $-0.46953 \times 10^{-3}$ |
| F line  | 1.71225, | $-0.12609 \times 10$, | $0.78182 \times 10^{-2}$, | $-0.47110 \times 10^{-3}$ |

$1/V_{10} = 0.0033$, $1/v_h = 0.0245$, $f/f_h = -1.0961$,
$t_G/f = 4.5024$, $N_{20} \times f^4 = 0.0040$, $N_{00d} = 1.7000$,
$a_{PAC} = 1.1573$

---

Embodiment 11

$f = 5$ mm, F number 1.67, $2\omega = 35°$ $r_1 = -12.8994$
  $d_1 = 4.5000$    $n_1 = 1.43875$    $v_1 = 94.97$
$r_2 = \infty$ (stop)
  $d_2 = 0$
$r_3 = \infty$
  $d_3 = 15.4727$    $n_2$ (gradient index lens element)
$r_4 = \infty$ -continued

Embodiment 11 gradient index lens element

|        | $N_{00}$ | $N_{10}$ | $N_{20}$ |
|--------|----------|----------|----------|
| d line | 1.60000, | $-0.99200 \times 10^{-2}$, | $0.16991 \times 10^{-4}$ |
| C line | 1.59600, | $-0.99348 \times 10^{-2}$, | $0.16991 \times 10^{-4}$ |
| F line | 1.60933, | $-0.98852 \times 10^{-2}$, | $0.16991 \times 10^{-4}$ |
| g line | 1.61696, | $-0.98651 \times 10^{-2}$, | $0.16991 \times 10^{-4}$ |

$1/V_{10} = -0.0050$, $1/\nu_h = 0.105$, $f/f_h = -0.1701$,
$t_G/f = 3.0945$, $N_{20} \times f^4 = 0.0106$, $N_{00d} = 1.6000$,
$a_{PAC} = 0.6780$

Embodiment 12 f = 4.38 mm, F number 1.95, 2ω = 40.6°

$r_1 = -17.2145$
  $d_1 = 7.1453$   $n_1 = 1.48749$   $\nu_1 = 70.21$
$r_2 = 6.6013$
  $d_2 = 0.4000$
$r_3 = \infty$
  $d_3 = 19.7061$   $n_2$ (gradient index lens element)
$r_4 = \infty$ gradient index lens element

|        | $N_{00}$ | $N_{10}$ | $N_{20}$ |
|--------|----------|----------|----------|
| d line | 1.60000, | $-0.88660 \times 10^{-2}$, | $0.90122 \times 10^{-5}$ |
| C line | 1.59600, | $-0.88542 \times 10^{-2}$, | $0.90122 \times 10^{-5}$ |
| F line | 1.60933, | $-0.88934 \times 10^{-2}$, | $0.90122 \times 10^{-5}$ |

$1/V_{10} = -0.0044$, $1/\nu_h = 0.142$, $f/f_h = -0.4914$,
$t_G/f = 4.5001$, $N_{20} \times f^4 = 0.0033$, $N_{00d} = 1.6000$,
$a_{PAC} = 1.4502$

Embodiment 13 f = 3.84 mm, F number 1.21, 2ω = 64.9°

$r_1 = -8.1476$
  $d_1 = 2.8898$   $n_1 = 1.72342$   $1 = 37.95$
$r_2 = \infty$
  $d_2 = 0$
$r_3 = \infty$
  $d_3 = 14.7528$   $n_2$ (gradient index lens element)
$r_4 = \infty$ gradient index lens element

|        | $N_{00}$ | $N_{10}$ | $N_{20}$ | $N_{30}$ |
|--------|----------|----------|----------|----------|
| d line | 1.65000, | $-0.13746 \times 10^{-1}$, | $-0.13709 \times 10^{-4}$, | $0.41168 \times 10^{-5}$ |
| C line | 1.64675, | $-0.13747 \times 10^{-1}$, | $-0.13709 \times 10^{-4}$, | $0.41168 \times 10^{-5}$ |
| F line | 1.65758, | $-0.13743 \times 10^{-1}$, | $-0.13709 \times 10^{-4}$, | $0.41168 \times 10^{-5}$ |

$1/V_{10} = -0.0003$, $1/\nu_h = 0.0264$, $f/f_h = -0.3411$,
$t_G/f = 3.8399$, $N_{20} \times f^4 = -0.0030$, $N_{00d} = 1.6500$,
$a_{PAC} = 0.9897$

Embodiment 14 f = 2.05 mm, object distance = 2.85 mm, NA = 0.085,
magnification 1×, 2ω = 31.4°

$r_1 = \infty$
  $d_1 = 8.6295$   $n_1$ (gradient index lens element)
$r_2 = \infty$
  $d_2 = 0.5000$
$r_3 = -1.7937$
  $d_3 = 1.4446$   $n_2 = 1.51633$   $\nu_2 = 64.15$
$r_4 = \infty$ gradient index lens element

|        | $N_{00}$ | $N_{10}$ | $N_{20}$ |
|--------|----------|----------|----------|
| d line | 1.66520, | $-0.40000 \times 10^{-1}$, | $-0.22554 \times 10^{-3}$ |
| C line | 1.65981, | $-0.39936 \times 10^{-1}$, | $-0.22526 \times 10^{-3}$ |
| F line | 1.67823, | $-0.40147 \times 10^{-1}$, | $-0.22621 \times 10^{-3}$ |

$1/V_{10} = 0.0053$, $1/\nu_h = 0.156$, $f/f_h = -0.5912$,
$t_G/f = 4.2013$, $N_{20} \times f^4 = -0.0040$, $N_{00d} = 1.6652$,
$a_{PAC} = 1.5095$

Embodiment 15 f = 4 mm, F number 2.0, 2ω = 44.8°

$r_1 = -10.3948$
  $d_1 = 1.0000$   $n_1 = 1.74100$   $\nu_1 = 52.65$
$r_2 = 7.5833$
  $d_2 = 0.3000$
$r_3 = \infty$
  $d_3 = 23.7362$   $n_2$ (gradient index lens element)
$r_4 = \infty$ gradient index lens element

|        | $N_{00}$ | $N_{10}$ | $N_{20}$ |
|--------|----------|----------|----------|
| d line | 1.70000, | $-8.0000 \times 10^{-3}$, | $6.3430 \times 10^{-6}$ |
| C line | 1.69533, | $-7.9912 \times 10^{-3}$, | $6.3430 \times 10^{-6}$ |
| F line | 1.71089, | $-8.0204 \times 10^{-3}$, | $6.3430 \times 10^{-6}$ |

Figure 8:
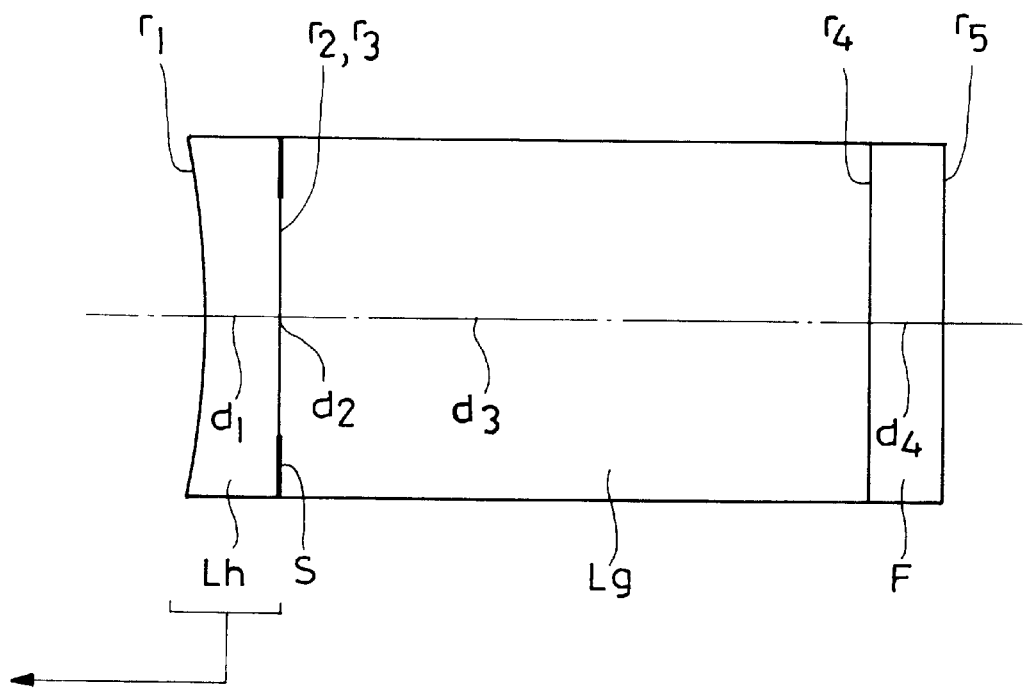

$1/V_{10} = 0.0037$, $1/\nu_h = 0.0190$, $f/f_h = -0.6920$,
$t_G/f = 5.9341$, $N_{20} \times f^4 = 0.0016$, $N_{00d} = 1.7000$,
$a_{PAC} = 1.2383$ The eighth embodiment of the present invention has a composition illustrated in FIG. 8. Speaking concretely, the eighth embodiment is an image pickup lens system composed, in order from the object side of a first negative homogeneous lens element and a second positive lens element which is a radial type gradient index lens element having two planar surfaces. The first negative lens element has a concave object side surface and a planar image side surface which is kept in close contact with the radial type gradient index lens element. Further, a stop S is disposed between the homogeneous lens element and the radial type gradient index lens element for lowering heights of offaxial rays passing through the image pickup lens system, thereby allowing its diameter to be reduced.

When a solid-stage image pickup device such as a CCD is disposed at a location of an image surface of the image pickup lens system according to the present invention, it is usable as an image pickup system, for example, in a video camera, a TV telephone or an interphone. Further, a filter F for cutting off components having specific wavelengths is cemented or kept to or in close contact with an image side surface of the radial type gradient index lens element. The filter F shown in FIG. 8 may be omitted when the radial gradient index lens element or the homogeneous lens element has a function of a filter for cutting off the components having the specific wavelengths. The filter may be disposed apart from the radial type gradient index lens element.

The eighth embodiment can be focused on an object located at an extremely short distance by moving the first lens element toward the object side. For this reason, the homogeneous lens element and the radial type gradient index lens element are not cemented to each other, but kept in close contact with each other.

When the eighth embodiment is focused on an object located at a short distance (object distance 100 mm), an airspace of 3.810 mm is reserved between the first lens element and the second lens element. The stop is kept in close contact with the second lens element and is not moved.

In the eighth embodiment, a diameter of the homogeneous lens element is equal to that of the radial type gradient index lens element so that optical axes of both the lens elements can be aligned easily.

When the image pickup lens system according to the present invention is not to be focused, the homogeneous lens element and the radial type gradient index lens element can be cemented to each other for simplifying a structure of a lens barrel.

In the eighth embodiment wherein the homogeneous lens element has the negative refractive power, the radial type gradient index lens element has a small positive value of $V_{10}$ for favorably longitudinal chromatic aberration.

For manufacturing the image pickup lens system according to the present invention at a low cost, it is desirable that the homogeneous lens element has a concave surface and a planar surface as in the eighth embodiment. A lens element which has a planar surface on one side can easily be polished and worked at a low cost.

The image pickup lens system according to the present invention has a merit for correcting aberrations which cannot be obtained with a radial type gradient index lens element on which spherical surfaces are worked directly. FIG. 17 shows a glass map, wherein refractive index $n_d$ is taken as the ordinate, Abbe's number $v_d$ is taken as the abscissa, a thick line enclosure indicates an approximate range of refractive indices and Abbe's numbers of currently available glass materials, arrows indicate variaitons of refractive indices and Abbe's numbers of radial type gradient index lens elements, and black spots represent refractive indices and Abbe's numbers on optical axes. Under the present circumstances of technologies for materials, refractive indices and Abbe's numbers of materials for radial type gradient index lens elements which are manufactured by the ion-exchange method and sol-gel method are within the range of the refractive indices and Abbe's numbers of the currently available glass materials as indicated by an arrow A in FIG. 17. It is extremely difficult to manufacture a material for radial type gradient index lens elements having a refractive index and an Abbe's number on an optical axis which are located within the range of the refractive indices and Abbe's numbers of the currently available glass materials and refractive indices and Abbe's numbers deviate from this range as portions of the radial type gradient index lens element are farther from the optical axis toward a marginal portion. However, such a material may be desired for correcting aberrations. A material indicated by an arrow B has a weak dispersing power and is advantageous for correction of chromatic aberration. However, the image pickup lens system according to the present invention can have an effect which is similar to that obtained with a material which has a refractive index distribution deviating from the range of refractive indices and Abbe's numbers of the currently available glass materials even when the lens system uses a radial type gradient index lens element which is made of a material within the range of refractive indices and Abbe's numbers of the currently available glass materials. This fact will be described concretely with reference to the eighth embodiment. An arrow A represents the radial type gradient index lens element used in the eighth embodiment which has $N_{00}$ of 1.75, $V_{00}$ of 45 and $V_{10}$ of approximately 200, and produces longitudinal chromatic aberration $PAC_A$ expressed by the following formula:

$$PAC_A = K(\phi_s/45 + \phi_m/200)$$

Further, longitudinal chromatic aberration $PAC_B$ indicated by the arrow B is expressed by the following formula:

$$PAC_B = K(\phi_s/70.21 + \phi_m/200)$$

However, the combination lens system preferred as the eighth embodiment which is composed of a homogeneous lens element having $n_h$ of 1.48749 and $v_h$ of 70.21 produces longitudinal chromatic aberration $PAC_C$ expressed by the following formula:

$$PAC_C = K(\phi_h/70.21 + \phi_m/200)$$

By selecting refractive powers of the homogeneous lens element so as to satisfy relationship of $\phi_h \approx \phi_s$, it is possible to obtain an image pickup lens system having an effect similar to that obtainable with the material indicated by the arrow B in FIG. 17 which can hardly be manufactured in practice. The image pickup lens system according to the present invention has a merit to permit enlarging freedom for correction of aberrations by selecting a desired homogeneous lens element.

Figure 9:
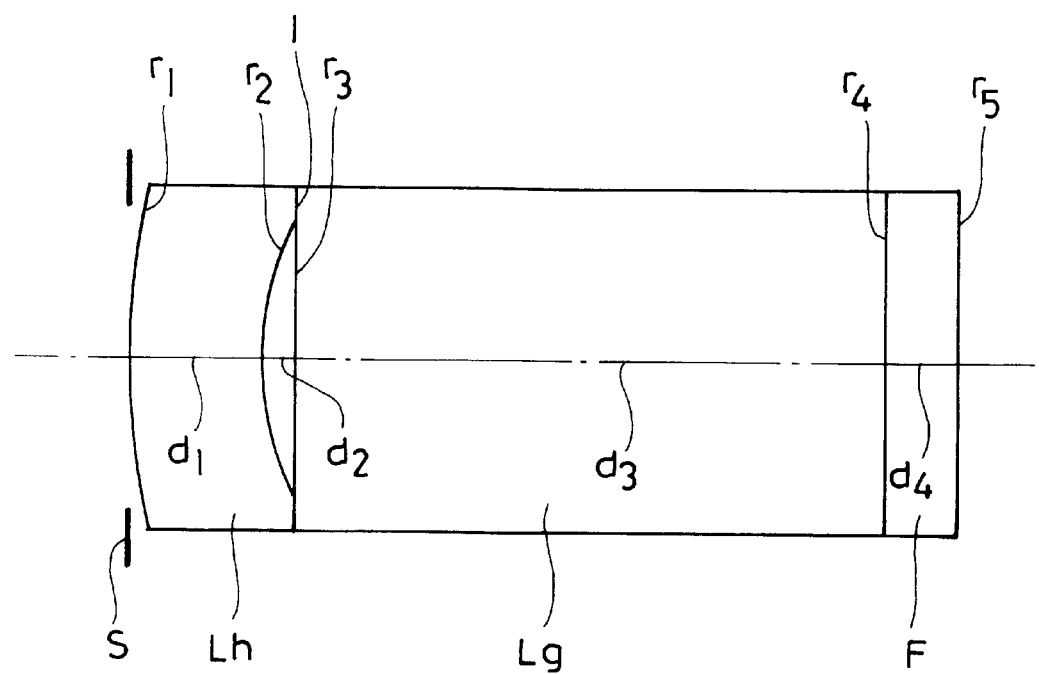

The ninth embodiment of the present invention has a composition illustrated in FIG. 9. Speaking concretely, an image pickup lens system preferred as the ninth embodiment is composed, in order from the object side, of a first negative homogeneous lens element and a second positive lens element with is a radial type gradient index lens element having two planar surfaces. The first lens element is a meniscus lens element having a concave image side surface which has a planar surface portion 1 formed outside an effective diameter thereof and cemented or kept to or in close contact with the radial type gradient index lens element on the planar surface portion 1. Further, a filter F for cutting off components having specific wavelengths is disposed on the image side of the radial type gradient index lens element.

The ninth embodiment is an example wherein the homogeneous meniscus lens element is used in place of the homogeneous lens element used in the eighth embodiment for obtaining an image pickup lens system having a different focal length though the radial type gradient index lens element is used commonly. This is to say, the image pickup lens system according to the present invention can be modified, as shown in FIG. 18, into an image pickup lens system having a different focal length producing aberrations in different amounts by combining a single kind of common radial type gradient index lens element $L_g$ with a homogeneous lens element having different r, d and n, for example a homogeneous lens element $L_{h1}$, $L_{h2}$ or $L_{h3}$. Since the radial type gradient index lens element is usable as a common part, the image pickup lens system according to the present invention can be manufactured at a low cost in spite of its merit that it is usable in various kinds of lens system used under white light sources.

The location of the stop S which is selected on the object side of the homogeneous lens element makes it possible to favorably correct longitudinal chromatic aberration in particular.

Since the ninth embodiment has a relatively long focal length and hardly allows longitudinal chromatic aberration in particular to be corrected, the homogeneous lens element is made of a highly dispersive glass material which has an Abbe's number satisfying $1/\nu_h > 0.03$. Further, the highly dispersive glass material selected for the homogeneous lens element is desirable also for correction of lateral chromatic aberration since the stop is disposed on the image side in the image pickup lens system.

Furthermore, the image side surface of the homogeneous lens element is configured as an aspherical surface for favorably correcting aberrations. The aspherical surface used in the ninth embodiment is expressed by the above-mentioned formula (m).

The ninth embodiment is also focused by moving the first lens element toward the object side. When the ninth embodiment is focused on an object located at a short distance (object distance 100 mm), an airspace of 1.5151 mm is reserved between the first lens element and the second lens element, and the stop is moved together with the first lens element.

Though the ninth embodiment is composed only of the two lens elements, it is capable of favorably correcting aberrations.

The tenth embodiment of the present invention has a composition illustrated in FIGS. 10A and 10B. Speaking concretely, the tenth embodiment is an image pickup lens system composed, in order from the object side, of a first negative lens element and a second positive lens element which is a radial type gradient index lens element having two planar surfaces. The first lens element is a plano-concave lens element having a planar surface portion 1 which is formed outside an effective diameter of an image side surface thereof and cemented or kept to or in close contact with the radial type gradient index lens element. Further, a stop S is disposed at a location 1 mm apart toward the image side as measured from an object side surface of the radial type gradient index lens element. Furthermore, a filter F for cutting off components having specific wavelengths is disposed on the image side of the radial type gradient index lens element.

The tenth embodiment is an example wherein a field angle of the image pickup lens system is widened by strentthening the negative refractive power of the homogeneous lens element and is usable in objective lens systems for endoscopes and so on. When the image pickup lens system according to the present invention is to be used, like the tenth embodiment, in lens systems having wide field angles, it is desirable to satisfy the following condition (33):

$$-1.5 < f/f_h < -0.4 \tag{33}$$

If the upper limit of −0.4 of the condition (33) is exceeded, it will be difficult to obtain an image pickup lens system having a wide field angle. If the lower limit of −1.5 of the condition (33) is exceeded, in contrast, a Petzval's sum will be overcorrected, thereby undesirably tilting an image surface in a direction away from an object.

Though the tenth embodiment which has the wide field angle hardly allows a Petzval's sum to be corrected since it has the wide field angle, a Petzval's sum is favorably corrected in the lens system by configuring the radial type gradient index lens element so as to satisfy $N_{00d} > 1.6$. For more favorable correction of a Petzval's sum it is desirable to satisfy $N_{00d} > 1.65$.

Further, a location of the stop selected in the radial type gradient index lens element makes it possible not only to reduce a diameter of the image pickup lens system but also to favorably correct offaxial aberrations in particular.

The homogeneous lens element and the radial type gradient index lens element can be cemented to each other in the image pickup lens system according to the present invention with a bonding agent applied to the planar surface portion represented by the reference numeral 1 in FIG. 10A or to an outer circumferential portion designated by the reference numeral 4 in FIG. 10B.

The eleventh embodiment of the present invention has a composition visualized in FIG. 11. In other words, the eleventh embodiment is an image pickup lens system composed, in order from the object side, of a first negative homogeneous lens element and a second positive lens element which is a radial type gradient index lens element having two planar surfaces. The first lens element is a concave-planar lens element having an image side surface which is cemented or kept to or in close contact with the radial type gradient index lens element. Further, a solid-state image pickup device or a solid-state image pickup unit is cemented or kept to or in close contact with a portion of an image side surface of the radial type gradient index lens element for obtaining an effect for compact design of the image pickup lens system or simplification of a structure of a lens barrel.

When the image pickup lens system according to the present invention is to be used in a lens system which has a relatively narrow field angle, it is undesirable that the homogeneous lens element has an extremely strong negative refractive power, but it is desirable to satisfy the following condition (34):

$$-0.8 < f/f_h < -0.1 \tag{34}$$

If the lower limit of −0.8 of the condition (34) is exceeded, a Petzval's sum will be overcorrected, thereby tilting an image surface in a direction away from an object. If the upper limit of −0.1 of the condition (34) is exceeded, in contrast, a Petzval's sum will be undercorrected, thereby undesirably tilting the image surface toward the object side.

When the image pickup lens system according to the present invention is to be used in an optical system for which transmittance or flare poses a problem, it is desirable to configure the radial type gradient index lens element so as to have a total length on the order of 40 mm or shorter. Imaging performance of the image pickup lens system can be improved by configuring the radial type gradient index lens element have a total length on the order of 25 mm or shorter.

For preventing flare from being produced by outer circumferences of the lens elements, it is effective to satinize outer circumferences of the lens elements or apply a paint having a relatively dark color such a black.

The image pickup lens system preferred as the eleventh embodiment favorably corrects aberrations though it is composed only of the two lens elements.

Figure 12:
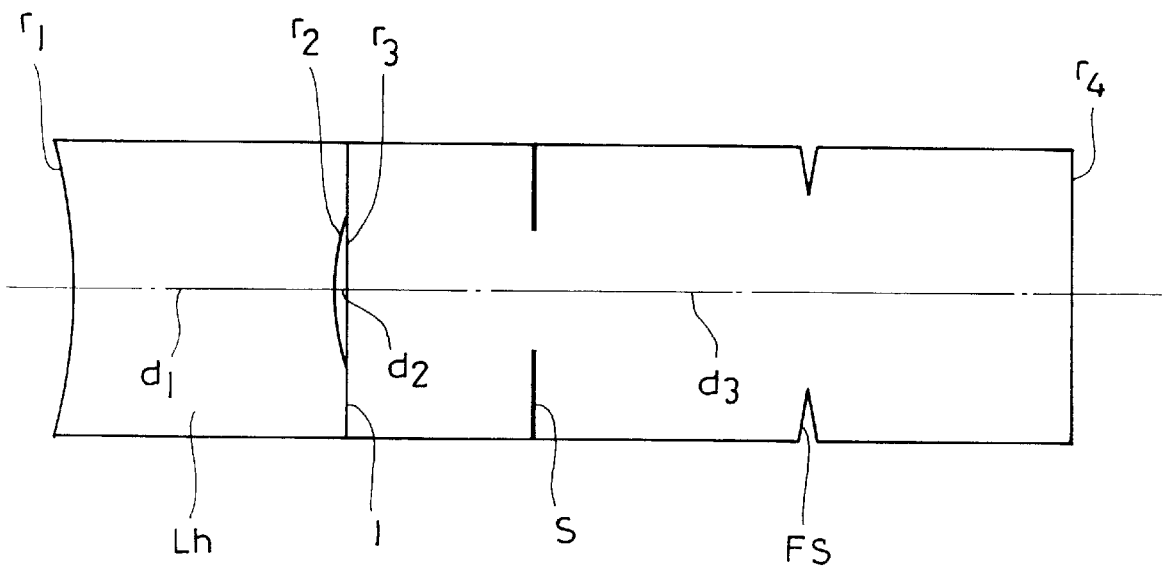

The twelfth embodiment has a composition shown in FIG. 12. That is to say, the twelfth embodiment is an image pickup lens system composed, in order from the object side, of a first negative lens element and a second positive lens element which is a radial type gradient index lens element having two planar surfaces. The first lens element is a biconcave lens element having an image side surface which has a planar surface portion 1 cemented or kept to or in close contact with the radial type gradient index lens element. Further an aperture stop S is disposed at a location apart 5 mm toward the image side as measured from an object side surface of the radial type gradient index lens element. Furthermore, a flare stop FS for cutting off flare components is disposed on the radial type gradient index lens element. Each of these stops can be manufactured by forming a cut from an outer circumference of the radial type gradient index lens element and applying a light shielding paint to the cut surface; cutting the radial type gradient index lens element, printing or depositing a stop on a cut surface; or sandwiching a thin sheet between cut pieces and recementing or bringing to or into close contact with each other.

Aberrations are corrected favorably in the twelfth embodiment though it is composed only of the two lens elements.

Figure 13:
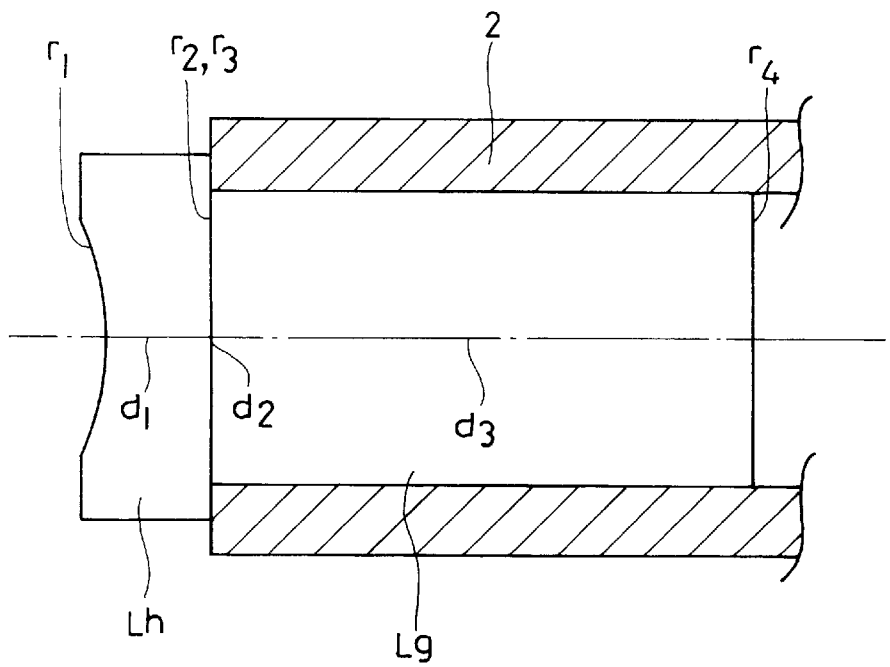

The thirteenth embodiment of the present invention shown in FIG. 13. Speaking concretely, the thirteenth embodiment is an image pickup lens system composed, in order from the object side, of a first negative homogeneous lens element and a second positive lens element which is a radial type gradient index lens element having two planar surfaces. The first lens element is a concave-planar lens element having an image side surface which is cemented or kept to or in close contact with the radial type gradient index lens element.

The radial type gradient index lens element has a diameter which is different from that of the homogeneous lens element so that a lens barrel or a portion 2 thereof can be effectively disposed, thereby configuring the image pickup lens system compact.

The thirteenth embodiment is capable of favorably correcting aberrations though it is composed only of the two lens elements.

Figure 14:
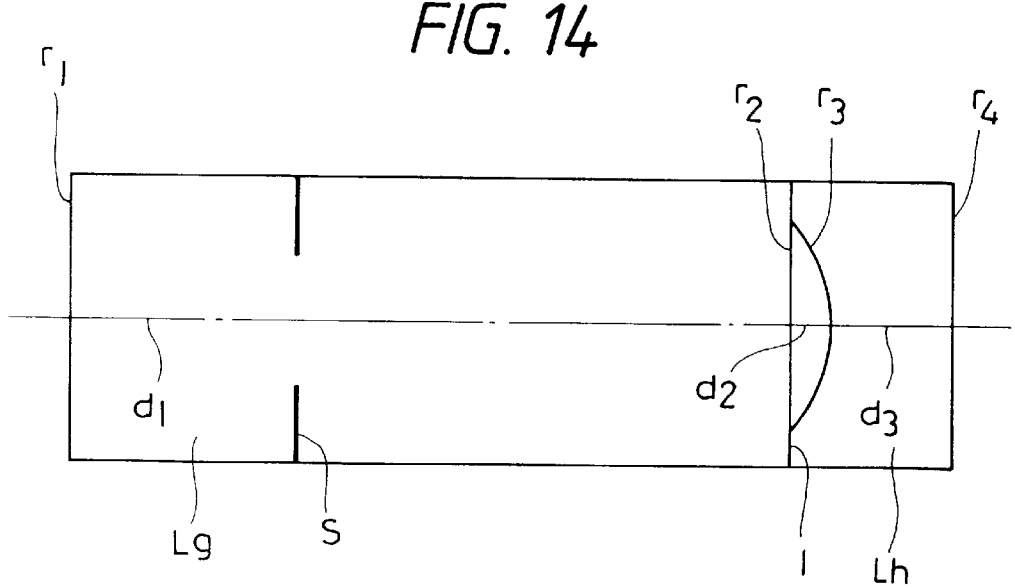

The fourteenth embodiment of the present invention has a composition illustrated in FIG. 14. In other words, the fourteenth embodiment is composed, in order from the object side, of a first lens element which is a radial type non-homogeneous lens element having two planar surfaces and a positive refractive power, and a second homogeneous lens element having a negative refractive power. The second homogeneous lens element is a concave-planar lens element having a planar surface portion 1 which is formed outside an effective diameter of an object side surface thereof and cemented or kept to or in close contact with the radial type non-homogeneous lens element. Further, a stop S is disposed at a location apart 2.7369 mm toward the image side as measured from an object side surface of the radial type non-homogeneous lens element.

The fourteenth embodiment is an optical system which forms an image at a magnification 1× and is usable as an image pickup lens system for video microscopes and so on when a solid-state image pickup device is disposed at a location of an image surface thereof.

The image pickup lens system preferred as the fourteenth embodiment corrects aberrations favorably though it is composed only of the two lens elements.

Figure 15A:
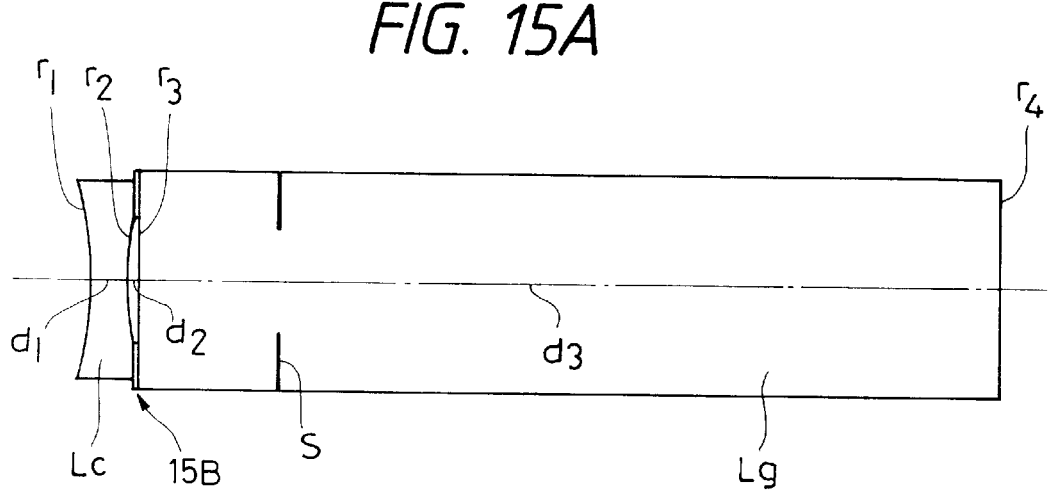
FIGS. 15A and 15B are sectional views illustrating a composition of a fifteenth embodiment of the present invention.
Figure 15B:
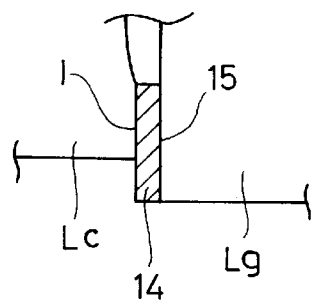
Figure 21:
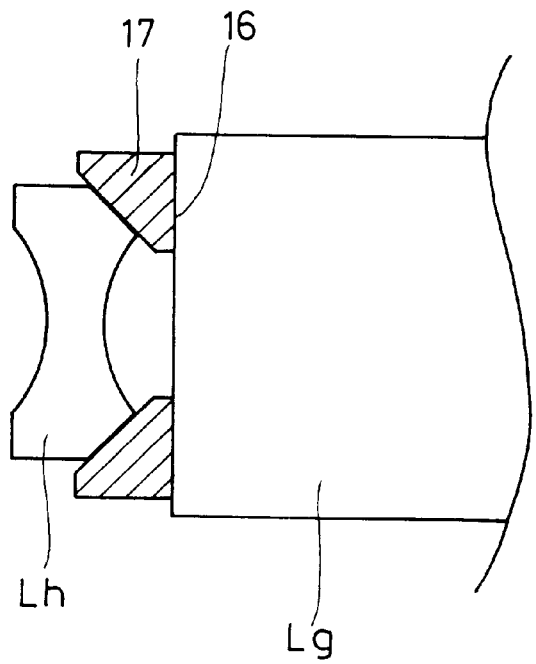
FIG. 21 is a diagram illustrating means for bringing a planar surface of a radial type gradient index lens element into close contact with a concave surface of a homogeneous lens element.
Figure 22:
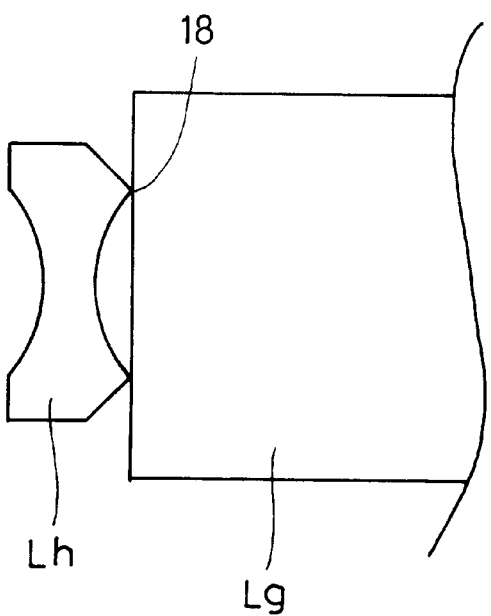
FIG. 22 is a diagram illustrating another example of means for bringing a planar surface of a radial type gradient index lens element into close contact with a concave surface of a homogeneous lens element.

The fifteenth embodiment has a composition illustrated in FIGS. 15A and 15B. In other words, the fifteenth embodiment is an image pickup lens system composed, in order from the object side, of a first negative lens element and a second positive lens element which is a radial type gradient index lens element having two planar surfaces. The first lens element is a biconcave lens element which has a planar surface portion 1 formed on an image side surface. A spacing ring 14 is sandwiched between the planar surface portion 1 and a planar surface portion 15 formed on the radial type gradient index lens element. Further, an aperture stop S is disposed at a location 3.8973 mm apart from an object side surface of the radial type gradient index lens element. Though it is desirable not to cement the first lens element, the spacing ring 14 and the radial type gradient index lens element in FIG. 15B when the image pickup lens system is to be focused by varying an airspace reserved between the first lens element and the second lens element, the first lens element, the spacing ring and the radial type gradient index lens element may be cemented to one another. Though the spacing ring 14 has two planar surfaces in the fifteenth embodiment, it is possible to shape the spacing ring so as to have surfaces slanted relative to an optical axis, for example, as shown in FIG. 21. In FIG. 21, optical axes of both the lens elements can be adjusted so as to align with each other by bringing the planar surface portion of the spacing ring 14 into close contact with a planar surface portion 16 of a radial type gradient index lens element Lg and sliding the contact surfaces. Further, it is possible to perform adjustment for aligning optical axes of both the lens elements without using the spacing ring by bringing a relatively sharp portion 18 of the concave homogeneous lens element into close contact with the radial type gradient index lens element as shown in FIG. 22.

For improving imaging performance, it is desirable that the homogeneous lens element has a biconcave shape as in the fifteenth embodiment. Aberrations to be produced by a homogeneous lens element can be reduced by configuring a homogeneous lens element so that a negative refractive power can be shared between two surfaces.

When the fifteenth embodiment is focused on an object located at a short distance (object distance 100 mm), an airspace of 0.6148 mm is reserved between the first lens element and the second lens element, and the aperture stop is fixed in the second lens element (gradient index lens element).

The fifteenth embodiment is capable of favorably correcting aberrations though it is composed only of the two lens elements.

Now, manufacturing procedures for the image pickup lens system will be described in details with reference to the accompanying drawings in comparison with the conventional examples.

FIGS. 19A, 19B and 19C show a model of conventional example wherein a spherical surface is formed directly on a radial type gradient index lens element. A radial type gradient index lens element which is not subjected to working of a spherical surface and its refractive index are shown in FIG. 19A, wherein the reference symbol $L_g$ represents a radial type gradient index lens element, the reference symbol n(r) designates a refractive index at a point located at a radial distance of r and an optical axis of medium 5 is aligned with a center axis of an outer circumference 6. FIG. 19B shows an example of ideal working of a spherical surface on one side surface wherein optical axes of surface and medium are aligned with each other. At a practical working stage, however, it is difficult to work a spherical surface $R_1$ with high precision and an optical axis 8 of the surface $R_1$ may be eccentric from an optical axis 5 for a distance of δ in a direction perpendicular to the optical axis of medium and at an inclination angle of ε. Though such an eccentricity poses no problem in case of a homogeneous lens element wherein the surface can be centered by cutting off an outer circumference taking an optical axis of a polished surface as standard, such centering is impossible in case of a radial type gradient index lens element since it produces eccentricity of an optical axis of medium relative to an outer circumference.

In the image pickup lens system according to the present invention, a radial type gradient index lens element having two planar surfaces is cemented or brought to or into close contact with a homogeneous lens element having a planar surface $P_2$ as shown in FIGS. 20A and 20B. FIG. 20A shows a radial type gradient index lens element $L_g$ having planar surfaces on both sides and a homogeneous lens element $L_h$ having a planar surface $P_2$ on one side. An optical axis 5 of medium of the radial type gradient index lens element $L_g$ is aligned with a center axis of an outer circumference 6 and an optical axis 10 of a surface $R_1$ can be aligned with the center axis of an outer circumference 11 since the homogeneous lens element $L_h$ can be centered. FIG. 20B shows the radial type gradient index lens element $L_g$ and the homogeneous lens element $L_h$ in a condition where they are cemented or brought to or into close contact with each other on the planar surfaces $P_1$ and $P_2$ thereof. In this condition, the optical axis of medium of the radial type gradient index lens element and the optical axis of the homogeneous lens element can easily be aligned with each other by matching the outer circumference 6 of the radial type gradient index lens element with the outer circumference 11 of the homogeneous lens element $L_h$.

The conventional procedures shown in FIGS. 19A, 19B and 19C cannot provide high field and enhances a manufacturing cost since the radial type gradient index lens element $L_g$ is unusable when the spherical surface is eccentric. The procedures according to the present invention illustrated in FIGS. 20A and 20B can assure high yield and permit manufacturing the image pickup lens system at an extremely low cost by solving the problem of eccentricity of a spherical surface. Further, the radial type gradient index lens element which has two planar surfaces can be worked with high high precision and at a low cost.

Figure 23:
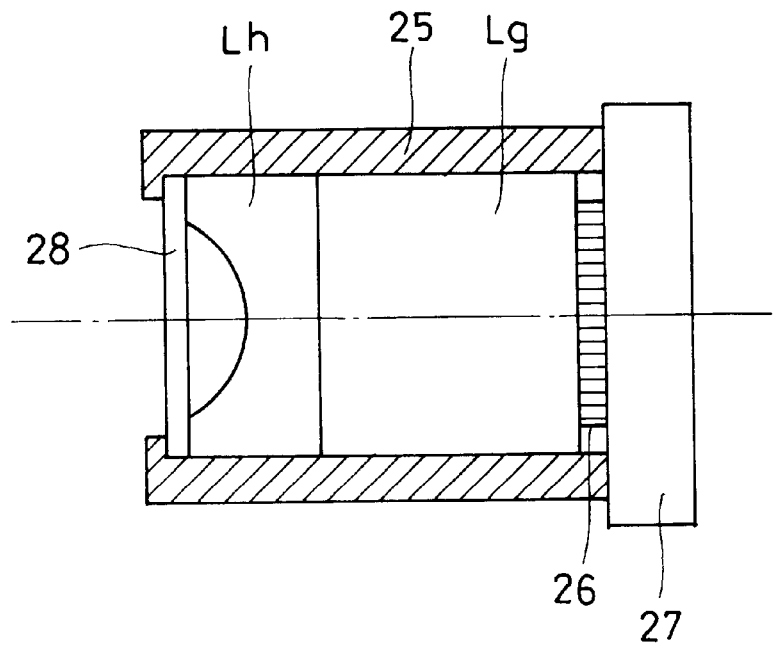
FIG. 23 is a diagram exemplifying assembly of the image pickup lens system according to the present invention into a lens barrel.

FIG. 23 shows an example wherein the image pickup lens system according to the present invention is assembled in a lens barrel having an extremely simple structure. In FIG. 23, the reference symbol $L_h$ represents a concave lens element, the reference symbol $L_g$ designates a radial type gradient index lens element and a reference numeral 25 denotes a lens barrel which has a cylindrical form in this example. Further, reference numerals 26 and 27 represent a solid-stage image pickup device and a processor circuit therefor, and a reference numeral 28 designates a cover glass plate for protecting the lens elements. The structure shown in FIG. 23 allows the homogeneous lens element and the radial type gradient index lens element to be dropped into the lens barrel 25, thereby remarkably facilitating assembly of the image pickup lens system. When the image pickup lens system is held with a lens barrel as in the fifteenth embodiment, it is not always necessary to cement the homogeneous lens element and the radial type gradient index lens element to each other. The image pickup lens system can be assembled with high precision by preliminarily cementing the homogeneous lens element and the radial type gradient index lens element to each other in a centered condition and then assembling the lens elements into a lens barrel. It is possible to preliminarily cement an image pickup device to the radial type gradient index lens element.

Further, it is possible to compose the cover glass plate 28 of an optical filter which functions to cut off components having specific wavelengths.

Figure 24:
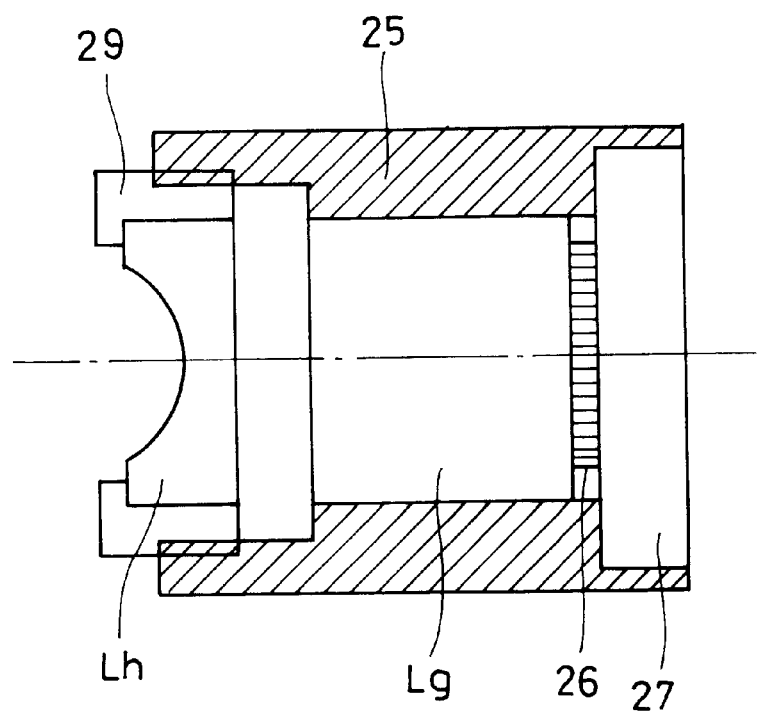
FIG. 24 is a diagram illustrating another example of assembly of the image pickup lens system according to the present invention into a lens barrel.

FIG. 24 shows a lens barrel structure which is configured to focus the image pickup lens system according to the present invention. In FIG. 24, the reference symbol $L_h$ represents a concave lens element, the reference symbol $L_g$ designates a radial type gradient index lens element and a reference numeral 25 denotes a lens barrel which holds the radial type gradient index lens element $L_g$ in this case. Reference numerals 26 and 27 represent a solid-stage image pickup device and a processor circuit therefore, and a reference numeral 29 designates a lens barrel which holds the homogeneous lens element $L_h$. Since the homogeneous lens element $L_h$ and the radial type gradient index lens element $L_g$ are held by different lens barrels 25 and 29 respectively as shown in FIG. 24, the image pickup lens system can be focused. Though the lens barrel 25 is connected to the lens barrel 29 through such a cam groove as that ordinarily used in a lens barrel for silver salt cameras, these lens barrels may be connected through threaded part or the image pickup lens system may be focused by sliding one of the lens barrels on a smooth contact surface.

It is desirable that the image pickup lens system according to the present invention satisfies, in place of the condition (21), the following condition (35):

$$-0.05 < 1/V_{10} < 0.01 \tag{35}$$

Each of the image pickup lens systems preferred as the eighth through fifteenth embodiments satisfies not only the condition (21) but also the condition (35).

The lens systems according to the present invention feature excellent workability and correct aberrations, longitudinal chromatic aberration and Petzval's sums in particular. Out of the lens system according to the present invention, the combination lens system is usable as a portion of a lens system or independently an image pickup lens system.

I claim:

1. A combination lens system comprising: at least one homogeneous lens element; and at least one radial type gradient index lens element having refractive indices distributed from an optical axis in a radial direction, wherein at least one surface of said radial type gradient index lens element is partially or entirely planar and wherein said homogeneous lens element satisfies the following condition (1):

$$1/V_{10} < 1/v_h \tag{1}$$

wherein the reference symbol $V_{10}$ represents a value which is given by the formula (c) shown below at i=1 and the reference symbol $v_h$ designates an Abbe's number of said homogeneous lens element:

$$V_{i0} = N_{i0d}/(N_{i0F} - N_{i0C}) \ (i=1, 2, 3, \ldots) \tag{c}$$

wherein the reference symbols $N_{00d}$, $N_{00F}$ and $N_{00C}$ represent refractive indices on an optical axis for the d-line, F-line and C-line, respectively, and the reference symbols $N_{10d}$, $N_{10F}$ and $N_{10C}$ designate distribution coefficients of the second order for the d-line, F-line and C-line, respectively, when the refractive index distribution of said gradient index lens element is expressed by a square formula; and said combination lens system satisfying the following condition (10):

$$N_{00d} > 1.55 \tag{10}$$

wherein the reference symbol $N_{00d}$ represents a refractive index of said gradient index lens element on the optical axis for the d-line.

2. A lens system to be used as an image pickup lens system consisting of a homogeneous lens element having a negative refractive power; and a radial type gradient index lens element having refractive indices distributed from an optical axis in a radial direction, wherein said lens system satisfies the following condition (21):

$$-0.5 < 1/V_{10} < 0.015 \tag{21}$$

wherein the reference symbol $V_{10}$ represents a value which is given by the formula (c) shown below at i=1:

$$V_{i0} = N_{i0d}/(N_{i0F} - N_{i0C}) \ (i=1, 2, 3, \ldots) \tag{c}$$

wherein the reference symbols $N_{10d}$, $N_{10F}$ and $N_{10C}$ represent distribution coefficients of the second order for the d-line, F-line and C-line respectively when the refractive index distribution of said gradient index lens element is expressed by a square formula.

3. A lens system consisting of: a homogeneous lens element having a negative refractive power; and a gradient index lens element having a positive refractive power, wherein said homogeneous lens element has a meniscus shape.

4. A lens system according to claim 3, said homogeneous lens element and said gradient index lens element are arranged from an object side in this order.

5. A lens system consisting of: a negative homogeneous lens element; and a positive gradient index lens element, wherein said homogeneous lens element has a biconcave shape.

6. A lens system according to claim 2, 3, or 5 satisfying the following condition (10):

$$N_{00d} > 1.55 \qquad (10)$$

wherein the reference symbol $N_{00d}$ represents a refractive index of said gradient index lens element on the optical axis for the d-line.

7. A lens system according to claim 2, 3, or 5 wherein said gradient index lens element has thickness not exceeding 40 mm.

8. A lens system according to claim 5, said homogeneous lens element and said gradient index lens element are arranged from an object side in this order.

9. A combination lens system comprising: at least one homogeneous lens element, and at least one radial type gradient index lens element having refractive indices distributed from an optical axis in a radial direction, wherein at least one surface of said radial type gradient index lens element is partially or entirely planar and wherein said homogeneous lens element satisfies the following condition (1):

$$1/V_{10} < 1/\nu_h \qquad (1)$$

wherein the reference symbol $V_{10}$ represents a value which is given by the formula (c) shown below at i=1 and the reference symbol $\nu_h$ designates an Abbe's number of said homogeneous lens element:

$$V_{10} = N_{i0d}/(N_{i0F} - N_{i0C}) \ (i=1, 2, 3, \ldots) \qquad (c)$$

wherein the reference symbols $N_{00d}$, $N_{00F}$ and $N_{00C}$ represent refractive indices on an optical axis for the d-line, F-line and C-line, respectively, and the reference symbols $N_{10d}$, $N_{10F}$ and $N_{10C}$ designate distribution coefficients of the second order for the d-line, F-line and C-line, respectively when the refractive index distribution of said gradient index lens element is expressed by a square formula; and said gradient index lens element has a thickness not exceeding 40 mm.

10. A lens system according to claim 1, or 9 wherein said homogeneous lens element has a negative refractive power.

11. A lens system according to claim 1, 2, 5, 6 or 9 wherein an entire area of at least one surface of said homogeneous lens element or a partial area of at least one surface of said homogeneous lens element is planar.

12. A lens system according to claim 1, 2, 3, 5 or 9 wherein a partial or entire area of at least one surface of said gradient index lens element is planar and said planar area is cemented or kept to or in close contact with a portion of said homogeneous lens element.

13. A lens system according to claim 1, 2, 3, 5, or 9 wherein a partial or entire area of at least one surface of said gradient index lens element is planar and said planar is cemented or kept to or close contact with a portion of said homogeneous lens element by way of a spacer.

14. A lens system according to claim 1, 2, 3, 5, or 9 satisfying the following condition (3):

$$0.1 < t_G/f_T < 7 \qquad (3)$$

wherein the reference symbol $t_G$ represents thickness of said gradient index lens element and the reference symbol $f_T$ designates a focal length of said lens system.

15. A lens system according to claim 9, wherein said homogeneous lens element has a negative refractive power.

16. A lens system according to claim 2, 10, 15 or 8 satisfying the following condition (29):

$$1/\nu_h < 0.03 \qquad (29)$$

wherein the reference symbol $\nu_h$ represents an Abbe's number of said homogeneous lens element.

17. An image pickup system according to claim 1, 2, 3 5 or 9 comprising said lens system.

18. A lens system comprising: at least one homogeneous lens element; and at least one gradient index lens element, wherein a partial or entire area of at least one surface of said gradient index lens element is planar and said planar area is in close contact with a portion of said homogeneous lens element, and wherein said lens system is focused on an object located at an extremely short distance by varying an airspace reserved between said homogeneous lens element and said gradient index lens element.

19. A lens system according to claim 18, said homogeneous lens element and said gradient index lens element are arranged from an object side in this order.

20. A lens system comprising: at least one homogeneous lens element; and at least one gradient index lens element, wherein a partial or entire area of at least one surface of said gradient index lens element is planar and said planar area is in close contact with a portion of said homogeneous lens element by way of a spacer, and wherein said lens system is focused on an object located at an extremely short distance by varying an airspace reserved between said homogeneous lens element and said gradient index lens element.

21. A lens system according to claim 20, said homogeneous lens element and said gradient index lens element are arranged from an object side in this order.

22. A lens system consisting of:

a homogeneous lens element having a negative refractive power; and a gradient index lens element having a positive refractive power; and wherein said homogeneous lens element has a meniscus shape, wherein said system satisfies the following condition (1):

$$1/V_{10} < 1/\nu_h \qquad (1)$$

wherein the reference symbol $V_{10}$ represents a value which is given by the formula (c) shown below at i=1 and the reference symbol $\nu_h$ designates an Abbe's number of said homogeneous lens element:

$$V_{10} = N_{i0d}/(N_{i0F} - N_{i0C}) \ (i=1, 2, 3, \ldots) \qquad (c)$$

wherein the reference symbols $N_{00d}$, $N_{00F}$ and $N_{00C}$ represent refractive indices on an optical axis for the d-line, F-line and C-line, respectively, and the reference symbols $N_{10d}$, $N_{10F}$ and $N_{10C}$ designate distribution coefficients of the second order for the d-line, F-line and C-line, respectively, when the refractive index distribution of said gradient index lens element is expressed by a square formula.

23. A lens system consisting of:

a negative homogeneous lens element; and a positive gradient index lens element, wherein said homogeneous lens element has a biconcave shape, wherein said system satisfies the following condition (1):

$$1/V_{10} < 1/v_h \qquad (1)$$

wherein the reference symbol $V_{10}$ represents a value which is given by the formula (c) shown below at i=1 and the reference symbol $v_h$ designates an Abbe's number of said homogeneous lens element:

$$V_{10} = N_{i0d}/(N_{i0F} - N_{i0C}) \ (i=1, 2, 3, \ldots) \qquad (c)$$

wherein the reference symbols $N_{00d}$, $N_{00F}$ and $N_{00C}$ represent refractive indices on an optical axis for the d-line, F-line and C-line, respectively, and the reference symbols $N_{10d}$, $N_{10F}$ and $N_{10C}$ designate distribution coefficients of the second order for the d-line, F-line and C-line, respectively, when the refractive index distribution of said gradient index lens element is expressed by a square formula.

24. A lens system comprising:

at least one homogeneous lens element; and at least one gradient index lens element, wherein a partial or entire area of at least one surface of said gradient index lens element is planar and said planar area is in close contact with a portion of said homogeneous lens element, and wherein said lens system is focused on an object located at an extremely short distance by varying an airspace reserved between said homogeneous lens element and said gradient index lens element, wherein said system satisfies the following condition (1):

$$1/V_{10} < 1/v_h \qquad (1)$$

wherein the reference symbol $V_{10}$ represents a value which is given by the formula (c) shown below at i=1 and the reference symbol $v_h$ designates an Abbe's number of said homogeneous lens element:

$$V_{i0} = N_{i0d}/(N_{i0F} - N_{i0C}) \ (i=1, 2, 3, \ldots) \qquad (c)$$

wherein the reference symbols $N_{00d}$, $N_{00F}$ and $N_{00C}$ represent refractive indices on an optical axis for the d-line, F-line and C-line, respectively, and the reference symbols $N_{10d}$, $N_{10F}$ and $N_{10C}$ designate distribution coefficients of the second order for the d-line, F-line and C-line, respectively, when the refractive index distribution of said gradient index lens element is expressed by a square formula.

25. A lens system comprising:

at least one homogeneous lens element; and at least one gradient index lens element, wherein a partial or entire area of at least one surface of said gradient index lens element is planar and said planar area is in close contact with a portion of said homogeneous lens element by way of a spacer, and wherein said lens system is focused on an object located at an extremely short distance by varying an airspace reserved between said homogeneous lens element and said gradient index lens element, wherein said system satisfies the following condition (1):

$$1/V_{10} < 1/v_h \qquad (1)$$

wherein the reference symbol $V_{10}$ represents a value which is given by the formula (c) shown below at i=1 and the reference symbol $v_h$ designates an Abbe's number of said homogeneous lens element:

$$V_{i0} = N_{i0d}/(N_{i0F} - N_{i0C}) \ (i=1, 2, 3, \ldots) \qquad (c)$$

wherein the reference symbols $N_{00d}$, $N_{00F}$ and $N_{00C}$ represent refractive indices on an optical axis for the d-line, F-line and C-line, respectively, and the reference symbols $N_{10d}$, $N_{10F}$ and $N_{10C}$ designate distribution coefficients of the second order for the d-line, F-line and C-line, respectively, when the refractive index distribution of said gradient index lens element is expressed by a square formula.

26. A lens system consisting of:

a homogeneous lens element having a negative refractive power; and a gradient index lens element having a positive refractive power, wherein said homogeneous lens element has a meniscus shape, wherein said system satisfies the following condition (21):

$$-0.5 < 1/V_{10} < 0.015 \qquad (21)$$

wherein the reference symbol $V_{10}$ represents a value which is given by the formula (c) shown below at i=1:

$$V_{i0} = N_{i0d}/(N_{i0F} - N_{i0C}) \ (i=1, 2, 3, \ldots) \qquad (c)$$

wherein the reference symbols $N_{00d}$, $N_{00F}$ and $N_{00C}$ represent refractive indices on an optical axis for the d-line, F-line and C-line, respectively, and the reference symbols $N_{10d}$, $N_{10F}$ and $N_{10C}$ designate distribution coefficients of the second order for the d-line, F-line and C-line, respectively, when the refractive index distribution of said gradient index lens element is expressed by a square formula.

27. A lens system consisting of:

a negative homogeneous lens element; and a positive gradient index lens element, wherein said homogeneous lens element has a biconcave shape, wherein said system satisfies the following condition (21):

$$-0.5 < 1/V_{10} < 0.015 \qquad (21)$$

wherein the reference symbol $V_{10}$ represents a value which is given by the formula (c) shown below at i=1:

$$V_{i0} = N_{i0d}/(N_{i0F} - N_{i0C}) \ (i=1, 2, 3, \ldots) \qquad (c)$$

wherein the reference symbols $N_{00d}$, $N_{00F}$ and $N_{00C}$ represent refractive indices on an optical axis for the d-line, F-line and C-line, respectively, and the reference symbols $N_{10d}$, $N_{10F}$ and $N_{10C}$ designate distribution coefficients of the second order for the d-line, F-line and C-line, respectively, when the refractive index distribution of said gradient index lens element is expressed by a square formula.

28. A lens system comprising:

at least one homogeneous lens element; and at least one gradient index lens element, wherein a partial or entire area of at least one surface of said gradient index lens element is planar and said planar area is in close contact with a portion of said homogeneous lens element, and wherein said lens system is focused on an object located at an extremely short distance by varying an airspace reserved between said homogeneous lens element and said gradient index lens element, wherein said system satisfies the following condition (21):

$$-0.5 < 1/V_{10} < 0.015 \tag{21}$$

wherein the reference symbol $V_{10}$ represents a value which is given by the formula (c) shown below at i=1:

$$V_{i0} = N_{i0d}/(N_{i0F} - N_{i0C}) \ (i=1, 2, 3, \ldots) \tag{c}$$

wherein the reference symbols $N_{00d}$, $N_{00F}$ and $N_{00C}$ represent refractive indices on an optical axis for the d-line, F-line and C-line, respectively, and the reference symbols $N_{10d}$, $N_{10F}$ and $N_{10C}$ designate distribution coefficients of the second order for the d-line, F-line and C-line, respectively, when the refractive index distribution of said gradient index lens element is expressed by a square formula.

29. A lens system comprising:

at least one homogeneous lens element; and at least one gradient index lens element, wherein a partial or entire area of at least one surface of said gradient index lens element is planar and said planar area is in close contact with a portion of said homogeneous lens element by way of a spacer, and wherein said lens system is focused on an object located at an extremely short distance by varying an airspace reserved between said homogeneous lens element and said gradient index lens element, wherein said system satisfies the following condition (21):

$$-0.5 < 1/V_{10} < 0.015 \tag{21}$$

wherein the reference symbol $V_{10}$ represents a value which is given by the formula (c) shown below at i=1:

$$V_{i0} = N_{i0d}/(N_{i0F} - N_{i0C}) \ (i=1, 2, 3, \ldots) \tag{c}$$

wherein the reference symbols $N_{00d}$, $N_{00F}$ and $N_{00C}$ represent refractive indices on an optical axis for the d-line, F-line and C-line, respectively, and the reference symbols $N_{10d}$, $N_{10F}$ and $N_{10C}$ designate distribution coefficients of the second order for the d-line, F-line and C-line, respectively, when the refractive index distribution of said gradient index lens element is expressed by a square formula.

* * * * *